(12) United States Patent
Walker et al.

(10) Patent No.: US 12,520,984 B2
(45) Date of Patent: Jan. 13, 2026

(54) SOAKER SINKS AND FLUID DISTRIBUTION ASSEMBLIES

(71) Applicant: Champion Industries, Inc., Winston-Salem, NC (US)

(72) Inventors: Andrew N. Walker, Ararat, NC (US); Kenneth M. Leftwich, Mount Airy, NC (US)

(73) Assignee: Champion Industries, Inc., Winston-Salem, NC (US)

( * ) Notice: Subject to any disclaimer, the term of this patent is extended or adjusted under 35 U.S.C. 154(b) by 437 days.

(21) Appl. No.: 17/548,714

(22) Filed: Dec. 13, 2021

(65) Prior Publication Data

US 2023/0180990 A1    Jun. 15, 2023

(51) Int. Cl.
*A47L 15/00* (2006.01)
*A47L 15/42* (2006.01)

(52) U.S. Cl.
CPC ....... *A47L 15/0078* (2013.01); *A47L 15/0021* (2013.01); *A47L 15/0086* (2013.01); *A47L 15/0092* (2013.01); *A47L 15/4246* (2013.01); *A47L 15/4278* (2013.01)

(58) Field of Classification Search
None
See application file for complete search history.

(56) References Cited

U.S. PATENT DOCUMENTS

| | | | | |
|---|---|---|---|---|
| 679,733 A | * | 8/1901 | Edgell | B05B 1/02 239/461 |
| 1,608,438 A | * | 11/1926 | Shelburne | B05B 7/083 239/300 |
| 1,995,331 A | | 3/1935 | Snyder | |
| 4,235,379 A | * | 11/1980 | Beamer | B05B 15/65 239/230 |
| 4,423,838 A | * | 1/1984 | Dinur | A01G 25/02 137/236.1 |
| 4,735,222 A | * | 4/1988 | Crane | A47L 15/241 239/557 |
| 4,773,436 A | * | 9/1988 | Cantrell | A47L 15/02 134/182 |
| 5,421,522 A | * | 6/1995 | Bowen | B29C 67/0029 285/344 |

(Continued)

FOREIGN PATENT DOCUMENTS

EP    2161513 B1 * 6/2014 ........... B60H 1/3442
GB    2348117 A * 9/2000 ......... A47L 15/0086

*Primary Examiner* — Omair Chaudhri
(74) *Attorney, Agent, or Firm* — Alston & Bird LLP

(57) ABSTRACT

An example soaker sink may include a sink basin that receives wash items therein and defines an inlet opening. The soaker sink may further include a manifold that defines an inlet opening, an interior that receives a fluid flow input via the inlet opening, and a plurality of outlets. The outlets may permit discharge of fluid from the interior of the manifold to the sink basin and may include at least a first outlet and may further include a common outlet dimension. The soaker sink may further include a pump fluidically coupled with the inlet opening of the sink basin and the inlet opening of the manifold to recirculate fluid from the sink basin to the manifold. A flow restrictor may be removably coupled with the first outlet and may be configured to modify a flow rate of the fluid discharged via the first outlet.

22 Claims, 14 Drawing Sheets

(56) References Cited

U.S. PATENT DOCUMENTS

| | | | |
|---|---|---|---|
| 5,497,946 A * | 3/1996 | Laidler | B05B 15/525 239/533.13 |
| 5,754,989 A | 5/1998 | Ludlow | |
| 5,775,347 A | 7/1998 | Hoover | |
| 5,810,036 A | 9/1998 | Hoover | |
| 5,927,616 A * | 7/1999 | Grise | A47L 15/247 134/201 |
| 5,937,880 A | 8/1999 | Payzant | |
| 6,609,259 B2 | 8/2003 | Cantrell | |
| 6,659,114 B2 | 12/2003 | Bigott | |
| 6,739,348 B2 | 5/2004 | Inch et al. | |
| 6,976,496 B2 | 12/2005 | Cantrell et al. | |
| 7,021,321 B2 | 4/2006 | Bigott | |
| 7,090,155 B1 * | 8/2006 | Rabitsch | B05B 1/046 239/521 |
| 7,162,788 B2 | 1/2007 | Inch et al. | |
| 7,246,624 B2 | 7/2007 | Cantrell et al. | |
| 7,475,698 B2 | 1/2009 | Bigott | |
| 7,523,757 B2 | 4/2009 | Cantrell et al. | |
| 7,527,062 B2 | 5/2009 | Bigott | |
| 7,578,305 B2 | 8/2009 | Bigott | |
| 7,763,119 B2 | 7/2010 | Bigott | |
| 7,775,220 B2 | 8/2010 | Goddard | |
| 7,887,642 B2 | 2/2011 | Jerg et al. | |
| 8,685,170 B2 | 4/2014 | Cantrell et al. | |
| 8,721,802 B2 | 5/2014 | Cantrell et al. | |
| 8,882,929 B2 | 11/2014 | Cantrell et al. | |
| 9,022,047 B2 | 5/2015 | Cantrell et al. | |
| 9,027,575 B2 | 5/2015 | Cantrell et al. | |
| 9,259,135 B2 | 2/2016 | Cantrell et al. | |
| 9,265,400 B2 | 2/2016 | Bigott | |
| 9,427,131 B2 | 8/2016 | Cantrell et al. | |
| 9,693,673 B2 | 7/2017 | Disch et al. | |
| D796,011 S | 8/2017 | Moore et al. | |
| 9,723,864 B2 | 8/2017 | Cantrell et al. | |
| 9,750,388 B2 | 9/2017 | John et al. | |
| 9,826,881 B2 | 11/2017 | Cantrell et al. | |
| 9,962,059 B2 | 5/2018 | Kramer | |
| 10,028,636 B2 | 7/2018 | Cantrell et al. | |
| 10,117,560 B2 | 11/2018 | Cantrell et al. | |
| 10,213,087 B2 | 2/2019 | Inch et al. | |
| 10,292,562 B2 | 5/2019 | Licata et al. | |
| 10,426,314 B2 | 10/2019 | Cantrell et al. | |
| 10,582,718 B2 | 3/2020 | Cantrell et al. | |
| 10,588,478 B2 | 3/2020 | Alali et al. | |
| D891,105 S | 7/2020 | Licata et al. | |
| 10,779,701 B2 | 9/2020 | Licata et al. | |
| 11,149,420 B1 * | 10/2021 | Grant | E03C 1/14 |
| 2003/0041887 A1 * | 3/2003 | Inch | F04D 29/4293 29/897.3 |
| 2003/0226199 A1 * | 12/2003 | Holtsnider | B05B 3/06 4/541.6 |
| 2004/0112412 A1 * | 6/2004 | Han | A47L 15/4221 134/186 |
| 2004/0144867 A1 * | 7/2004 | Ferrazza | B05B 1/042 239/483 |
| 2004/0250837 A1 * | 12/2004 | Watson | A47L 15/4278 134/32 |
| 2006/0196528 A1 * | 9/2006 | Jarvis | A47L 15/0092 134/186 |
| 2006/0243823 A1 * | 11/2006 | Bachmann | B60S 1/52 239/513 |
| 2009/0205870 A1 * | 8/2009 | Smith | E21B 10/62 175/57 |
| 2010/0181757 A1 * | 7/2010 | Rosch | F16L 27/11 285/200 |
| 2011/0203619 A1 * | 8/2011 | Kara | B05B 1/28 134/174 |
| 2011/0284663 A1 * | 11/2011 | Natterer | B05B 1/202 239/587.5 |
| 2012/0211028 A1 | 8/2012 | Bigott | |
| 2012/0318299 A1 | 12/2012 | Bigott | |
| 2013/0062436 A1 * | 3/2013 | Miyauchi | B05B 1/08 239/284.1 |
| 2013/0092194 A1 * | 4/2013 | Carlson | A47L 15/428 134/198 |
| 2014/0097272 A1 * | 4/2014 | Nishio | B60S 1/52 239/284.1 |
| 2014/0261821 A1 | 9/2014 | Bigott | |
| 2014/0338115 A1 | 11/2014 | Sadler | |
| 2015/0182096 A1 * | 7/2015 | Kim | A47L 15/4282 134/179 |
| 2015/0182103 A1 * | 7/2015 | Jung | A47L 15/4278 134/182 |
| 2016/0120741 A1 | 5/2016 | Spicer | |
| 2016/0158465 A1 * | 6/2016 | Coats | A61M 11/00 604/289 |
| 2017/0224003 A1 | 8/2017 | Moore et al. | |
| 2017/0224188 A1 * | 8/2017 | Licata | A47L 15/4208 |
| 2018/0055331 A1 | 3/2018 | Cantrell et al. | |
| 2018/0078111 A1 | 3/2018 | Cantrell et al. | |
| 2018/0325347 A1 | 11/2018 | Cantrell et al. | |
| 2019/0069751 A1 | 3/2019 | Cantrell et al. | |
| 2019/0282059 A1 * | 9/2019 | Curtis | A47L 15/16 |
| 2019/0320700 A1 | 10/2019 | Wansitler | |
| 2020/0054187 A1 | 2/2020 | Inch et al. | |
| 2020/0108421 A1 * | 4/2020 | Licata | B08B 3/10 |
| 2021/0000321 A1 | 1/2021 | Licata et al. | |
| 2021/0068611 A1 | 3/2021 | Cantrell et al. | |
| 2021/0268995 A1 * | 9/2021 | Krishnan | F16K 27/003 |
| 2021/0404106 A1 * | 12/2021 | Enslin | D06F 39/125 |
| 2022/0025620 A1 | 1/2022 | Eilmus | |
| 2022/0364343 A1 | 11/2022 | Eilmus | |

\* cited by examiner

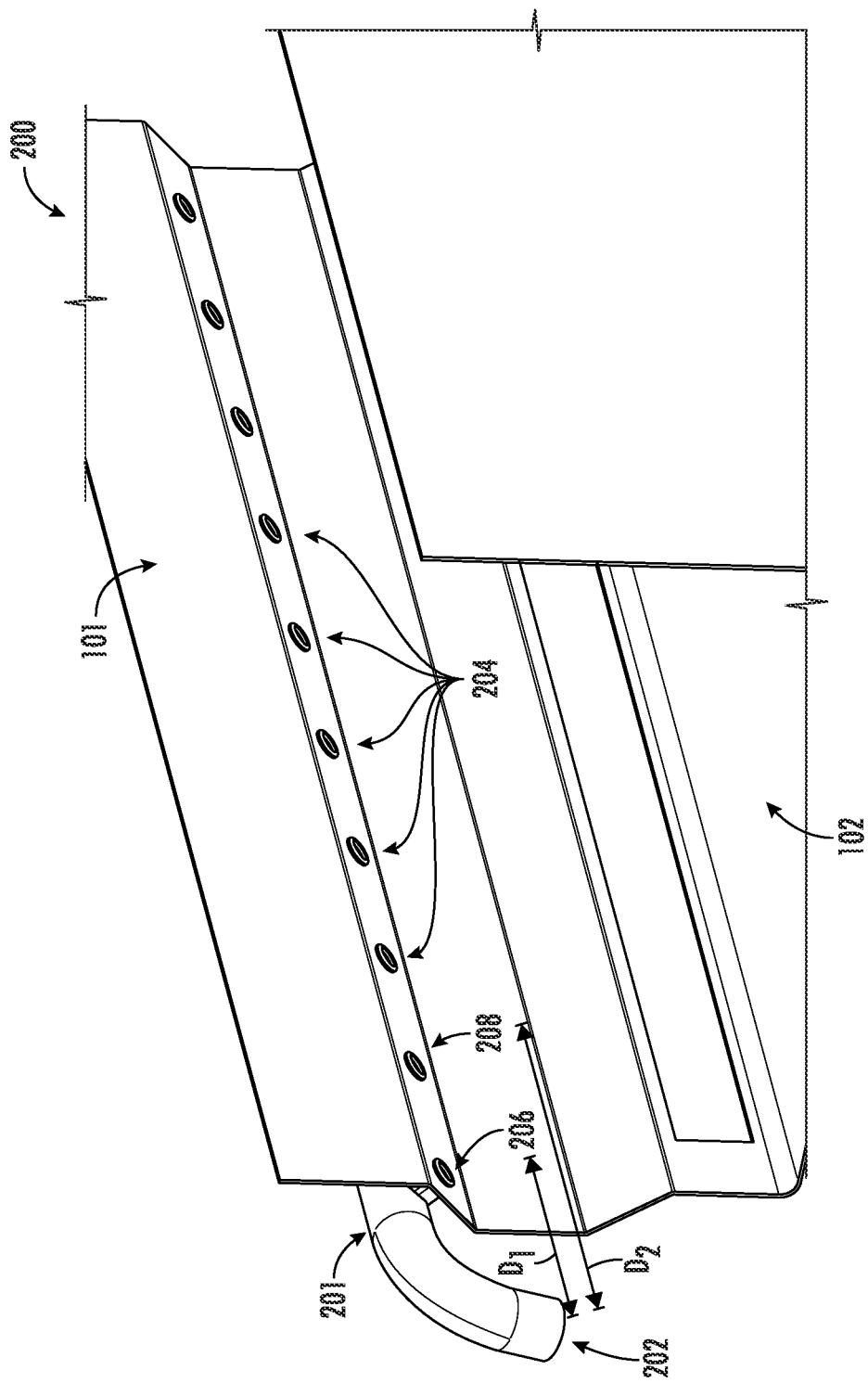

SOAKER SINKS AND FLUID DISTRIBUTION ASSEMBLIES

FIELD OF THE INVENTION

Embodiments of the present disclosure relate generally to washing devices and methods, components, and assemblies related thereto, and, in some embodiments, to soaker sinks.

BACKGROUND

Washing devices (e.g., sinks, dishwashers, etc.) are used in a variety of industries to clean and sanitize dishes, cutlery, pots and pans, and associated instruments for these industries. For example, restaurants, retailers, and the like may employ commercial soaker sinks that support or otherwise receive dishware therein (e.g., inside a basin, washing container, tub, etc.) and circulate water through the soaker sink in order to dislodge or otherwise remove items attached to the dishware. Applicant has identified a number of deficiencies and problems associated with washing devices. Through applied effort, ingenuity, and innovation, many of these identified problems have been solved by developing solutions that are included in embodiments of the present disclosure, many examples of which are described in detail herein.

BRIEF SUMMARY

As described above, various industries and use cases rely upon washing devices in order to properly clean various wash items. In some instances, such as in restaurants, other commercial retailers, and other residential and non-residential washing environments, soaker sinks may be used to facilitate this cleaning process. For example, a soaker sink may include a basin or other enclosure that is configured to support various items of dishware (e.g., plates, silverware, cutlery, pots, pans, other dishware and cookware, etc.) at least partially submerged in fluid supported by the basin. The fluid within the basin may be circulated so as to agitate or otherwise facilitate the removal of soils attached to the dishware and may leverage detergents and/or temperature in order to properly sanitize the dishware.

The present disclosure relates to soaker sinks and fluid distribution assemblies for such sinks. Soaker sinks may include fluid recirculation capabilities driven by one or more pumps that pull fluid from the sink basin into an inlet opening and redistribute fluid via a manifold to create agitation within the sink basin and thereby to clean the dishes. In some embodiments, removable flow restrictors may be used in outlets associated with the manifold to control the flow rate through each of a plurality of outlets and to collectively control the agitation in the sink basin.

The effectiveness of this recirculation and associated washing action within the soaker sink was conventionally thought to be predominately driven by the volumetric or mass flow rate of the fluid reentering the sink basin, and the solution was frequently increasing the size of the recirculation pump to increase agitation within the sink. Some embodiments of the present disclosure may operate to increase the velocity of the fluid entering the sink basin as an example mechanism for improving the effectiveness of the washing action within the sink basin, which may increase the net agitation and circulation flow within the sink without requiring a larger pump. As described herein, example implementations of embodiments of the present disclosure may utilize a fluid distribution assembly that includes a plurality of outlet openings that include an outlet dimension (e.g., cross-sectional area, diameter, or the like) capable of being controlled to adjust the flow rate and velocity of the outlet (e.g., by swapping flow restrictors having different dimensions). The outlet openings may further be equally spaced along a length of the manifold. The embodiments of the present disclosure may reduce the outlet dimension (e.g., cross-sectional area, diameter, or the like) for one or more outlets (e.g., via flow restrictors or narrower nozzle bodies) thereby increasing the velocity of the fluid discharged via the outlets to collectively control the washing action. By relying upon increased fluid discharge velocity as opposed to volumetric or mass flow rate, the embodiments of the present disclosure may reduce the operational requirements of other elements of the soaker sink while also providing an improved washing action. Due to the reduced volumetric or mass flow rate, embodiments of the present disclosure may, for example, reduce the required pump power output (e.g., leverage a smaller or less power intensive pump) and/or adjust the manifold body dimensions (e.g., reduce the cross-sectional area of the manifold body).

In order to address these problems and others, example implementations of embodiments of the present disclosure may additionally or alternatively utilize a fluid distribution assembly that provides in situ modification of fluid flow rate and may provide fluid flow outlets having adjustable fluid flow properties to adjust the relative flow between multiple outlets and/or collectively set fluid flow properties for the wash process. In some embodiments, the assembly may include a manifold that receives a fluid flow input (e.g., fluid recirculated by a pump from a sink basin) and outputs this fluid flow via a plurality of outlets in the manifold. To dynamically modify the flow rate of this fluid, the embodiments herein may leverage one or more flow restrictors that may be removably coupled with at least one outlet from amongst the plurality of outlets in the manifold. In some embodiments, these flow restrictors may be selectively used with various outlets to modify the relative properties (e.g., volumetric or mass flow rate, velocity, etc.) at which fluid is reintroduced to the sink basin. In some embodiments, the outlets may define different, fixed sizes configured to control the relative properties of the outlets.

Various embodiments described herein may be further configured to balance the discharge of fluid from the manifold such that the flow rate of each outlet into the sink basin is substantially uniform. In some embodiments, the relative position between the location at which fluid enters the manifold and the position at which fluid is discharged from the manifold may be varied along with a cross-sectional area of the outlets. In some embodiments, the narrowest cross-sectional area of each outlet, inclusive of the effects of any flow restrictors, may be the same if flow differences between nozzles are minimal or satisfactory to the user depending upon the structure and use of the soaker sink.

Accordingly, soaker sinks and associated fluid distribution assemblies are disclosed herein for providing variable and/or balanced fluid discharge for improved washing operations which were historically unavailable. The example embodiments of the present disclosure are described herein with reference to a commercial soaker sink configured to implement one or more elements of an example fluid distribution assembly. The present disclosure, however, contemplates that the devices, apparatuses, and systems described herein may be applicable to other implementations in which variable and/or balance fluid discharged is desired.

In an example embodiment, a soaker sink may be provided that includes a sink basin configured to receive one or more wash items therein where the sink basin defines an inlet opening. The soaker sink may further include a fluid distribution assembly that includes a manifold and a pump fluidically coupled with the inlet opening of the sink basin and an inlet opening of the manifold to recirculate fluid from the sink basin to the manifold for delivery of the fluid into the sink basin. The fluid distribution assembly may include a manifold defining an inlet opening, an interior configured to receive a fluid flow input via the inlet opening, and a plurality of outlets configured to permit discharge of fluid from the interior of the manifold to a basin of the soaker sink. The plurality of outlets may include at least a first outlet. In some embodiments, each of the each of the plurality of outlets including the first outlet may include or otherwise define a common outlet dimension and/or varied outlet dimensions so as to collectively control washing action within the basin of the soaker sink. In some embodiments, the fluid distribution assembly may further include a flow restrictor removably coupled with the first outlet, such that the flow restrictor is configured to control a flow rate of the fluid discharged via the first outlet.

In some embodiments, the first outlet may define a nozzle body that extends from a manifold body of the manifold that is configured to engage a wall of a sink basin to connect the first outlet with the sink basin.

In some further embodiments, the soaker sink may include a flow restrictor removably coupled with the first outlet, such that the flow restrictor is configured to modify a flow rate of the fluid discharged via the first outlet. The flow restrictor may be configured to be removably secured within the nozzle body. In such an embodiment the fluid distribution system may further include a fastener configured to removably secure the flow restrictor to the nozzle body.

In some embodiments, the fastener may include a leaf spring, and the nozzle body may define a groove configured to receive the leaf spring therein to removably secure the flow restrictor within the nozzle body.

In some further embodiments, an internal bore of the nozzle body may define a first cross-sectional area at its narrowest longitudinal point. An internal bore of the flow restrictor may define a second cross-sectional area at its narrowest longitudinal point smaller than the first cross-sectional area such that securing the flow restrictor within the nozzle body reduces the flow rate of the first outlet.

In some embodiments, the manifold may include a tubular manifold body, and the plurality of outlets may be equally spaced along a length of the tubular manifold body.

In some embodiments, the fluid distribution assembly may include a plurality of flow restrictors, including the flow restrictor where each of the plurality of flow restrictors is removably coupled with a respective one of the plurality of outlets, including the flow restrictor removably coupled with the first outlet.

In some further embodiments, a relative positioning between each of the plurality of outlets and respective dimensions defined by each flow restrictor to control a respective flow rate of each outlet may be configured to collectively balance the discharge of fluid from the interior of the manifold body such that the flow rate associated with each outlet is substantially uniform.

In some embodiments, the plurality of outlets may define the first outlet and a second outlet. In such an embodiment the manifold may define a first flow path from the inlet of the manifold to the sink basin via the first outlet and a second flow path from the inlet of the manifold to the second basin via the second outlet. The first outlet opening may be disposed closer to the inlet opening of the manifold than the second outlet opening, and the second flow path may define a narrowest cross-sectional area that is smaller than a narrowest cross-sectional area of the first outlet opening.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 7A is a front view of a portion of the soaker sink of FIG. 1 including an example flow distribution assembly according to some embodiments;

DETAILED DESCRIPTION

Figure 1:
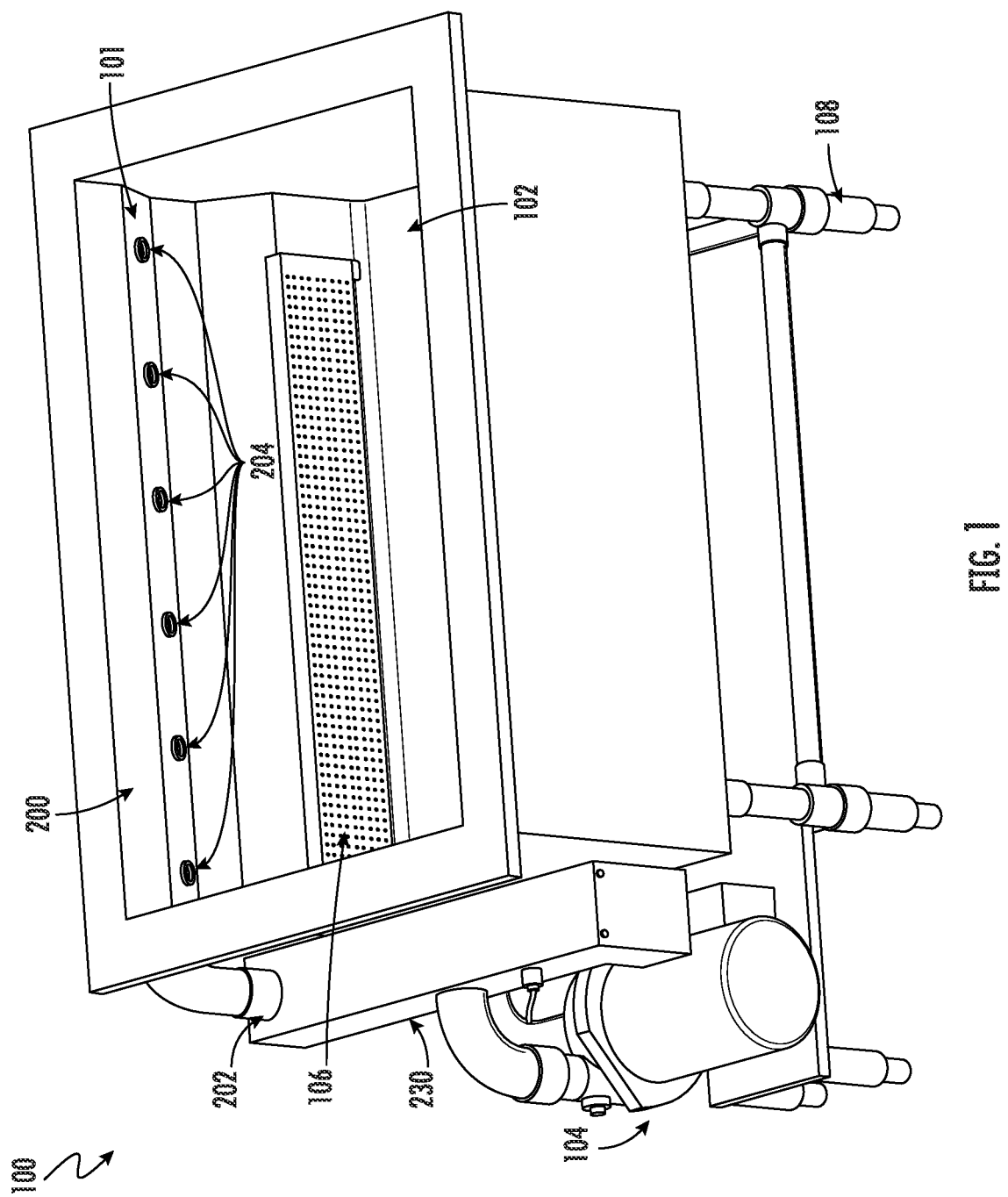
FIG. 1 is a perspective view of an example soaker sink in which flow distribution assemblies according to some example embodiments described herein are implemented.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Soaker Sink

With reference to FIGS. 1-6, an example soaker sink 100 is illustrated. As shown, the soaker sink 100 may include a sink basin 102 configured to receive one or more wash items therein. The sink basin 102 may define or be otherwise formed by one or more walls, for example wall 101, so as to define a location capable of supporting items and fluid therein. The soaker sink may thereby facilitate fully submerging the wash items for soaking and continuous washing. Although described herein with reference to a basin, the present disclosure contemplates that the sink basin 102 may refer to any location within which fluid and wash items may be supported within the appliance. In some embodiments, as shown in FIGS. 1-6, the sink basin 102 may be at least partially open so as to allow access to the wash items supported by the sink basin 102 during operation (e.g., via an open top). In other embodiments, however, the sink basin 102 may instead define an enclosure that, via a door or otherwise, permits selective access to the interior of the sink basin 102 (e.g., a closed washing implementation). The sink basin 102 may further be in fluid communication (e.g., fluidically coupled) with one or more fluid supply lines (not shown) configured to provide fluid to the soaker sink 100 for use in the recirculation described herein (e.g., a freshwater inlet).

As described above, the sink basin 102 may be configured to receive or otherwise support one or more wash items (e.g., plates, silverware, cutlery, pots, pans, other dishware and cookware, etc.) therein. In some embodiments, the sink basin 102 may define one or more support structures (e.g., racks, shelves, etc.) upon which wash items may be placed (not shown). In doing so, the sink basin 102 may operate to properly distance items within the sink basin 102 to ensure proper fluid within, around, etc. these items. Although illustrated as a single, open structure, the present disclosure contemplates that the sink basin 102 may, in some embodiments, include various partitions, separators, or the like (not shown) configured to define separated locations within the sink basin 102. In such an embodiment, the partitions, separators, etc. may be perforated or otherwise provide for fluid communication within the sink basin 102 to ensure proper fluid circulation as described above.

Still further, although illustrated as a distinct sink basin 102, the present disclosure contemplates that the sink basin 102 may operate as part of a collection of basins or enclosures as part of the same soaker sink 100 or a plurality of interconnected soaker sink devices. As shown, the soaker sink 100 may, in some embodiments, be supported by a frame 108 such that the soaker sink operates as a standalone implementation. In other embodiments, however, the frame 108, wall 101, etc. may be configured to interface with components of another sink basin or soaker sink. Said differently, the present disclosure contemplates that the soaker sinker 100 may operate as a modular component as part of an integrated washing system. Therefore, in any embodiment, the present disclosure contemplates that the soaker sink 100, sink basin 102, frame 108, wall(s) 101, and/or the like may be dimensioned (e.g., sized and shaped) based upon the intended application of the system and/or may be portions of a larger device or system. By way of a nonlimiting example, the soaker sink 100 may be dimensioned such that the width (W) of the soaker sink 100 is approximately 36 inches to approximately 66 inches wide. In one example embodiment, a soaker sink 100 may be 66 inches wide and 21 inches deep. As described hereafter with reference to FIG. 7A and FIG. 12, the angle at which fluid is reintroduced into the sink basin 102 (e.g., via the plurality of outlets 204) may also depend upon the associated dimensions of the sink basin 102.

Figure 2:
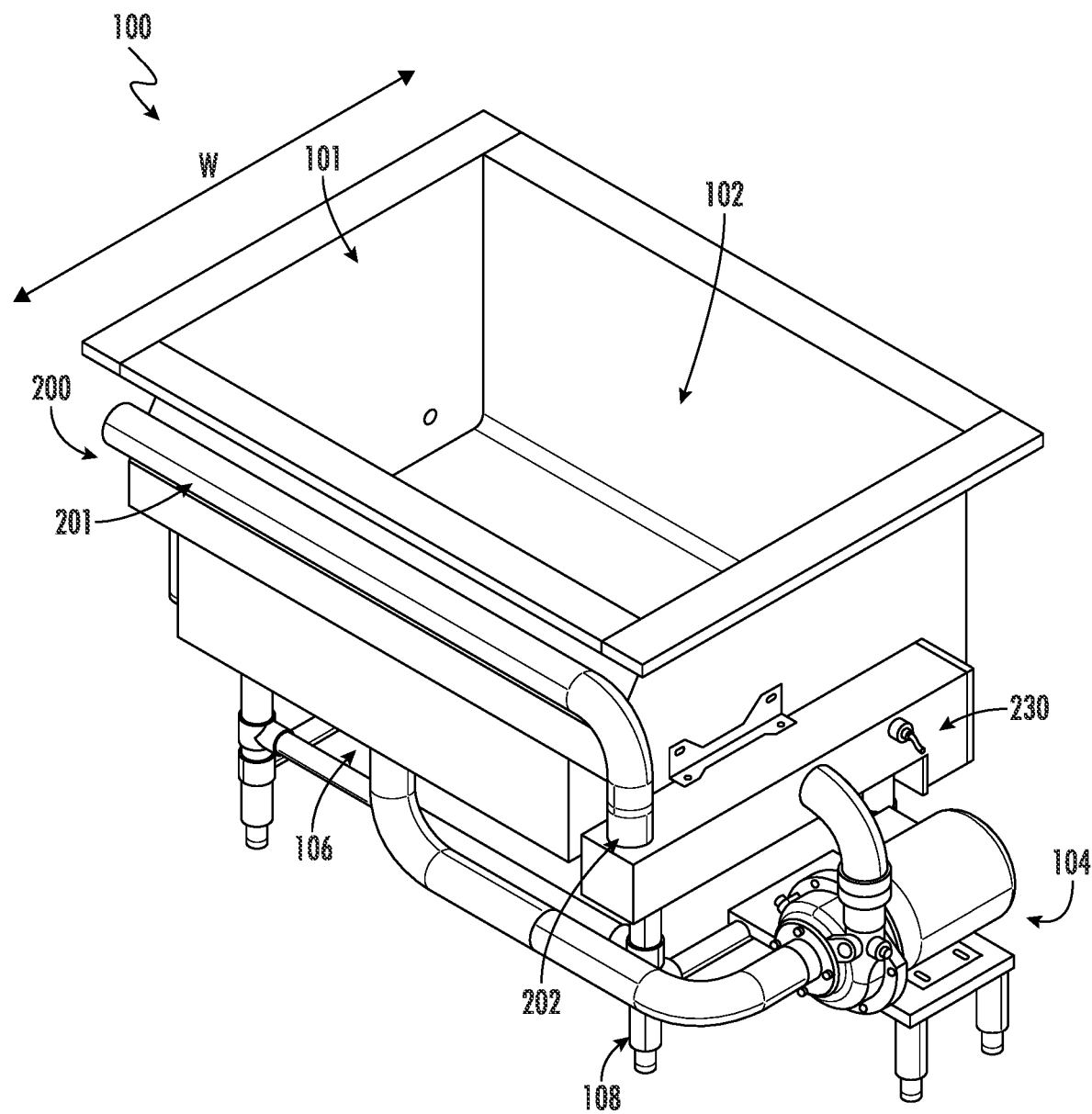
FIG. 2 is another perspective view of the soaker sink of FIG. 1 according to some embodiments.
Figure 3:
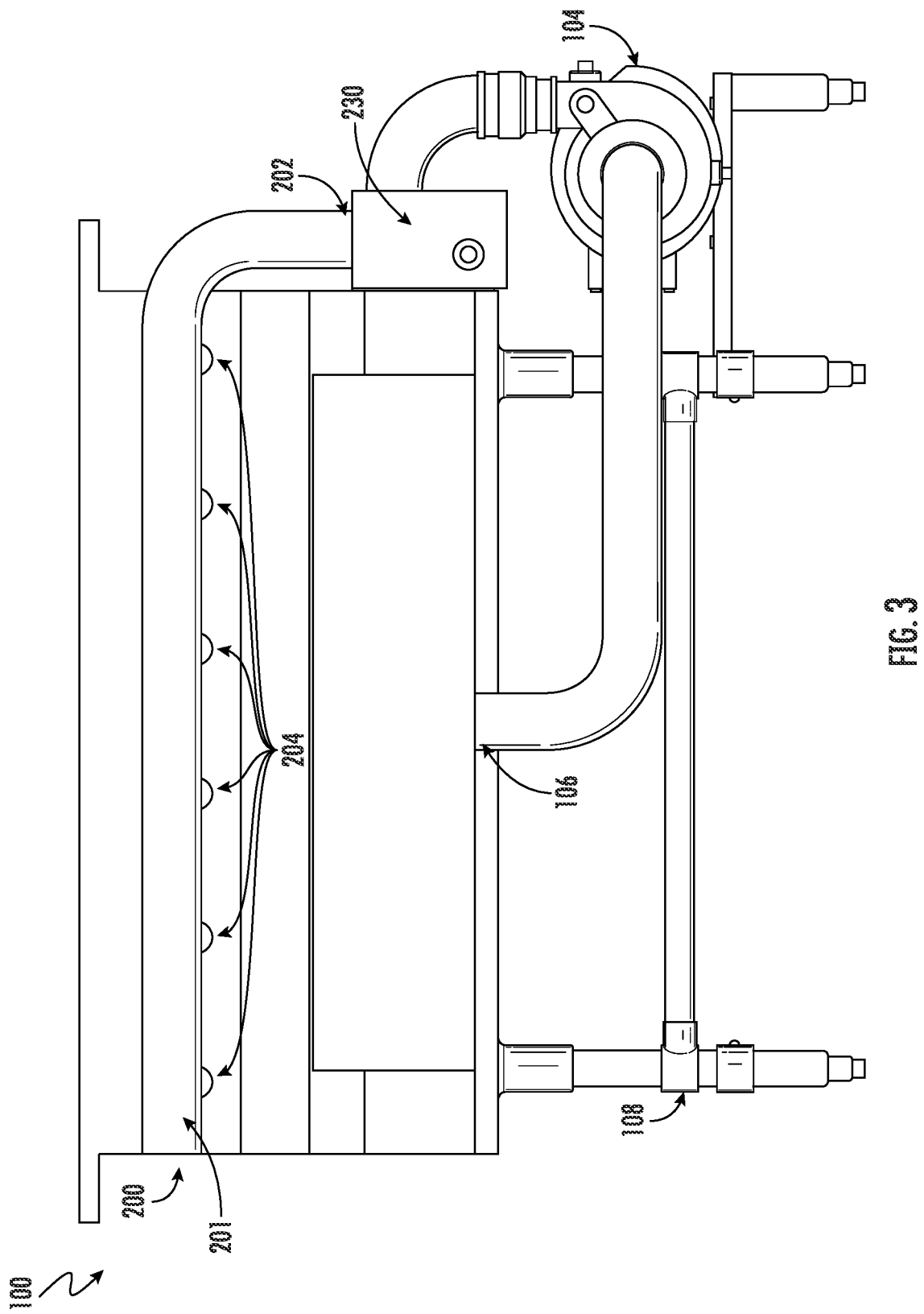
FIG. 3 is a rear view of the soaker sink of FIGS. 1-2 according to some embodiments.
Figure 5:
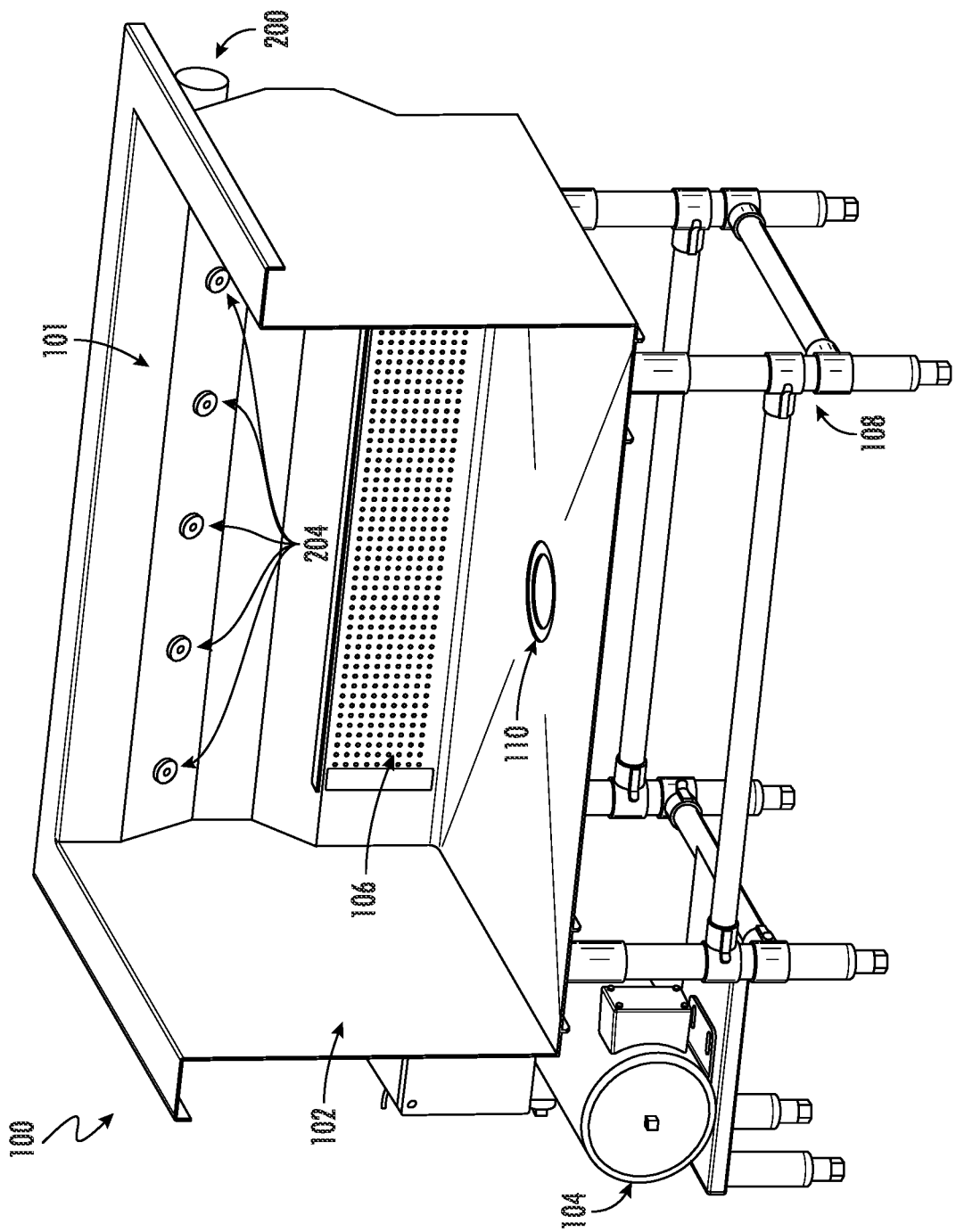
FIG. 5 is a cross-sectional view of the soaker sink of FIGS. 1-4 along A-A according to some embodiments.
Figure 6:
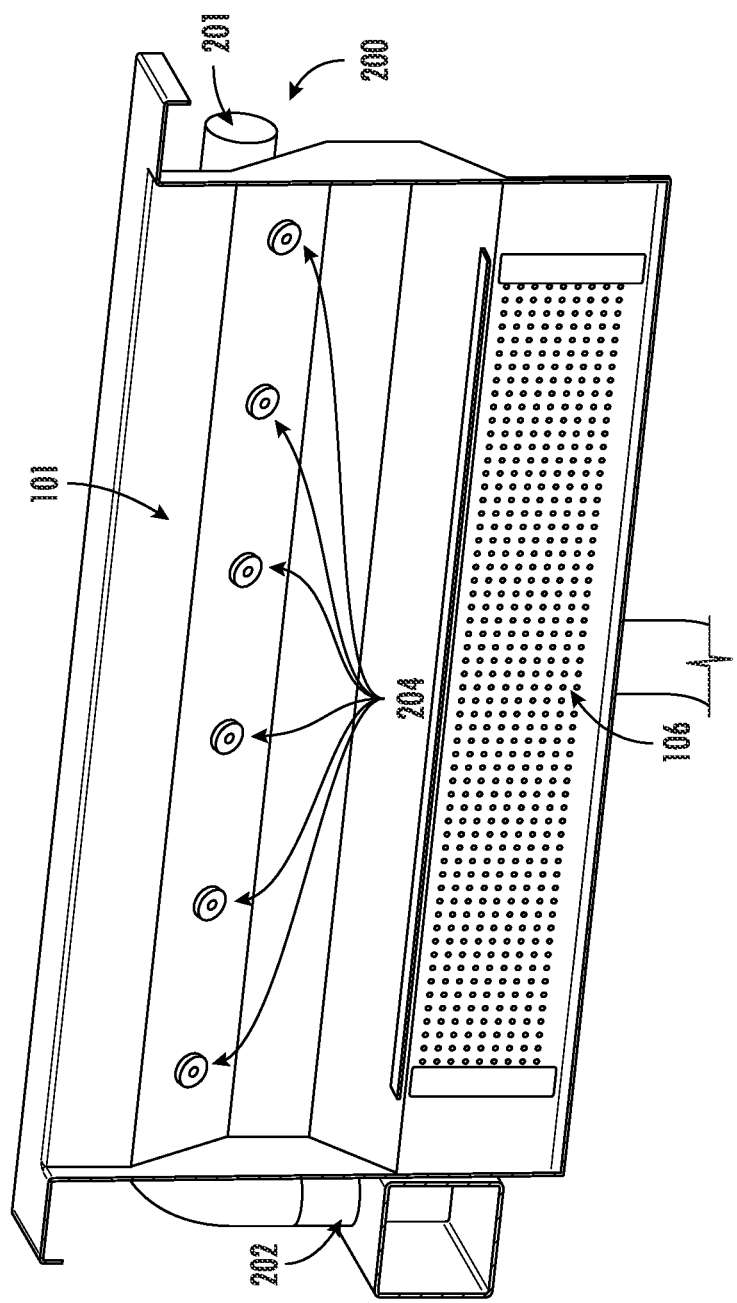
FIG. 6 is a cross-sectional view of the soaker sink of FIGS. 1-4 along B-B according to some embodiments.

With reference to FIGS. 1, 5, and 6, the sink basin 102 may also define an inlet opening 106 in fluid communication (e.g., fluidically coupled) with the sink basin 102. As depicted, the inlet opening 106 may include a rectangular manifold coupled to a rectangular opening in a wall 101 of the sink basin with a cylindrical conduit coupled to the rectangular manifold. The rectangular base of the manifold may include a circular conduit therein, and the upper edges of the manifold may be sloped to match the shape of the angled wall above it as shown in FIGS. 2-3. The cylindrical conduit of the inlet opening 106 connecting the inlet opening to a pump 104 (e.g., as shown in FIG. 3). In order to allow for recirculation of fluid from the sink basin 102 within the soaker sink, the inlet opening 106 may be configured to permit fluid from the sink basin 102 to be drawn into the pump 104. The inlet opening 106 as shown is positioned proximate a bottom surface of the sink basin 102 and covered by a perforated grate, filter, cover, etc. (e.g., as shown in FIGS. 1, 5). Such a grate may operate to prevent particulate matter from exiting the sink basin 102 and being drawn into the pump via the inlet opening 106 so as to mitigate or prevent damage to the pump 104 in fluid communication (e.g., fluidically coupled) with the inlet opening 106 (e.g., by preventing debris within the sink basin 102 from being drawn into and breaking the pump). Although illustrated as a single inlet opening 106 with an associated covering, the present disclosure contemplates that the inlet opening 106 may define a plurality of openings in one or more walls 101 of the sink basin 102 with or without accompanying manifolds connecting the sink basin to the pump based upon the intended application of the system 100.

As described hereafter with reference to FIGS. 7A-10, the soaker sink 100 may include a fluid distribution assembly 200 configured to receive fluid from the pump 104 and discharge the fluid into the sink basin 102. The fluid distribution assembly 200 may define a manifold 201 that defines an interior (e.g. interior 203 in FIG. 8) configured to receive a fluid flow input from the pump 104 via an inlet opening 202. The manifold 201 may include a plurality of outlets 204 spaced along a length of the manifold that permit discharge of fluid from the interior of the manifold 201 to the sink basin 102 as described hereafter. In the depicted embodiment, the manifold 201 defines a generally cylindrical shape arranged parallel to and spaced from the wall 101 of the sink basin 102. In some embodiments, the manifold 201 may be attached to, spaced from, integral with, or otherwise connected, directly or indirectly, with the wall 101 of the sink basin 102.

The manifold 201 may also include other cross-sectional shapes, including but not limited to circular, rectangular, square, etc. Some embodiments described herein rely upon a manifold 201 having a plurality of outlets 204 having an outlet dimension (e.g., cross-sectional area, diameter, etc.) that may be the same or different, and that may be controllable to determine the collective flow rate and velocity of the fluid leaving the nozzles and to adjust the flow rate and velocity between nozzles, such that the plurality of outlets are configured to collectively control washing action within the basin of the soaker sink 100. The outlet dimension may be defined by a diameter or cross-sectional area of one or more flow restrictors (e.g., flow restrictor 300 shown in FIG. 9) as described herein, or by any other parameter of the flow restrictors that changes the flow rate and velocity of liquid through the outlet. In some embodiments, the outlets 204 may include a nozzle body 205 having a common internal diameter and the net diameter of the outlet may be adjusted by the one or more flow restrictors, such that each outlet has the same or a different controllable net outlet dimension as described herein. In some embodiments, the size of the outlet (e.g., with or without flow restrictors) may facilitate control of the velocity of the fluid entering the sink basin 102 and the flow rate of fluid entering the sink basin 102 as an example mechanism for improving the efficiency and effectiveness of the washing action within the sink basin 102. The size of the outlets may collectively be adjusted to change the total velocity of fluid entering the sink basin, and the outlets may be adjusted individually to vary or synchronize the velocity of fluid entering the sink basin across each nozzle. In some embodiments, the volumetric or mass flow rate associated with such an implementation may be reduced while increasing or maintaining the velocity using the outlet configurations described herein, such that the dimensions of the manifold 201 may be reduced relative to conventional systems.

As shown in FIGS. 1-5, the pump 104 of the soaker sink 100 may be in fluid communication (e.g., fluidically coupled) with the inlet opening 106 of the sink basin 102 and the inlet opening 202 of the manifold 201 (and thus the fluid distribution assembly 200) to recirculate fluid from the sink basin 102 to the manifold 201 (and thus the fluid distribution assembly 200) for delivery of the fluid back into the sink basin 102 to facilitate the recirculation action in the sink. In some embodiments, a heater chamber 230 may be connected within the recirculation assembly (e.g., between the pump 104 and manifold 201 as shown in FIG. 3). The recirculation may create a washing action within the sink basin, whereby the fluid is continuously flowing in a generally circular path within the basin to remove debris from the wash items. As would be evident to one of ordinary skill in the art in light of the present disclosure, the pump 104 may be configured to provide suction, generate negative pressure within the sink basin 102, positive displacement, or otherwise cause fluid transfer between the inlet opening 106 of sink basin 102 and the fluid distribution assembly 200 for delivery back into the sink basin via the outlets. As such, the present disclosure contemplates that the pump 104 may comprise one or more valve-less pumps, stem pumps, gravity pumps, velocity pumps, impulse pumps, positive displacement pumps, peristaltic pumps, or any combination thereof. In some embodiments, the pump 104 may be an impeller-based, fully enclosed, self-draining pump.

The present disclosure contemplates that the operating parameters (e.g., suction pressure, discharge pressure, pump speed, power, flow, head, etc.) and dimensions of the pump 104 may be varied based upon the intended application of the soaker sink 100. Additionally, although illustrated with a single pump 104, the present disclosure contemplates that any number of pumps at any location may be used by the soaker sink 100 to drive fluid recirculation as described herein. By increasing the velocity of the fluid entering the sink basin as an example mechanism for improving the effectiveness of the washing action within the sink basin as opposed to a reliance upon increased volumetric or mass flow rate, embodiments of the present disclosure may also reduce the operational requirements of the pump 104. For example, the soaker sink 102 may leverage a smaller or less power intensive pump 104 while continuing to provide an improved washing action relative to conventional systems. By way of a nonlimiting example, the pump 104 may include a three-phase pump configured to output a flow rate of 200 gallons per minute regardless of sink size.

Figure 4:
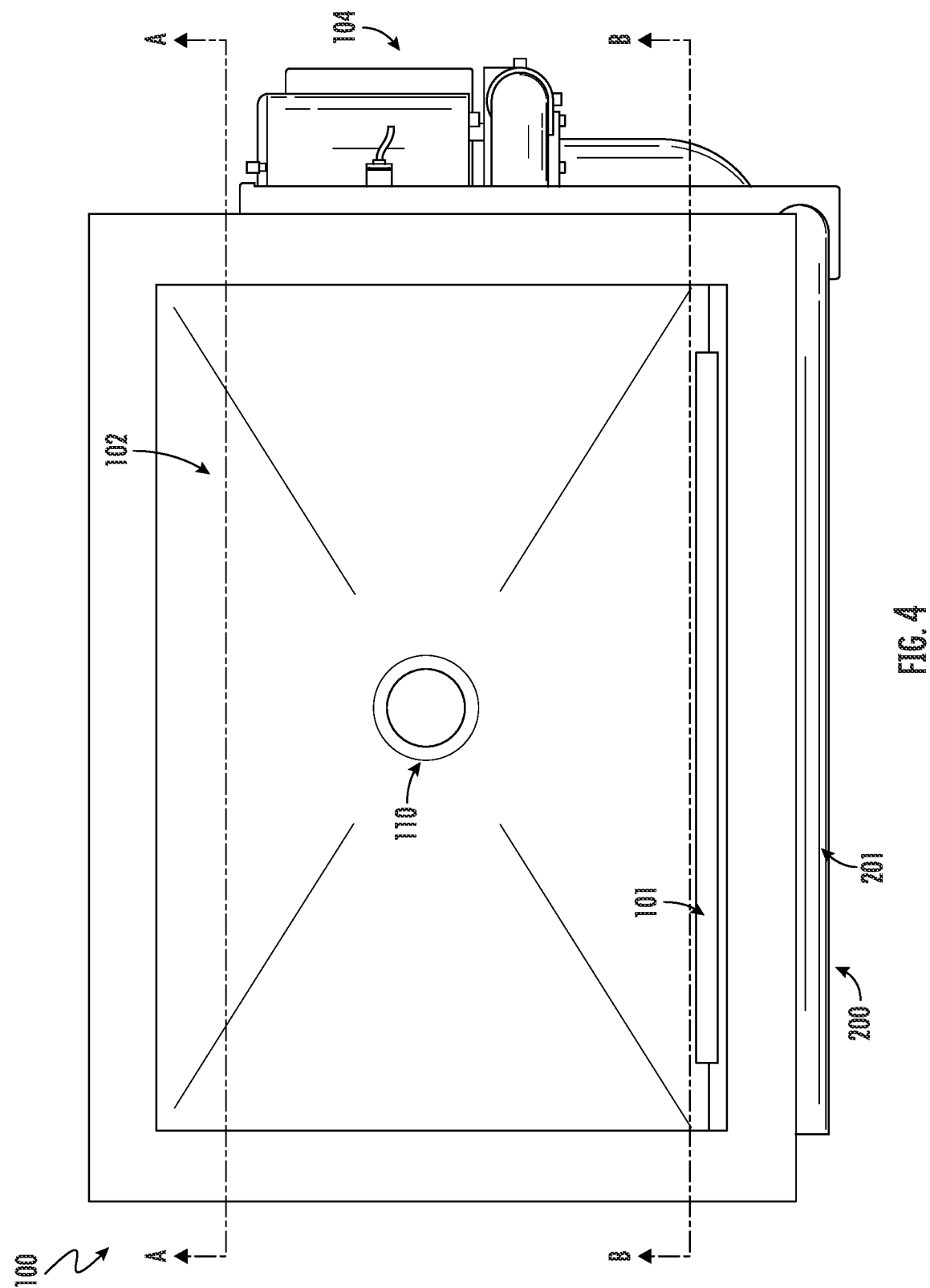
FIG. 4 is a top view of the soaker sink of FIGS. 1-3, according to some embodiments.

As shown in FIG. 4, the sink basin 102 may further define a drain 110 configured to remove fluid from the sink basin 102. By way of example, fluid may be continually recirculated from the sink basin 102 to the fluid distribution assembly 101 via the pump until a determined number of cycles has occurred, a period of time has expired, a predetermined soil level is reached in the washing fluid, and/or the like. Furthermore, the drain 110 may additionally or alternatively be used to remove fluid from the sink basin 102 in response to a contamination or other related hazard. In some embodiments, the drain 110 may be gravity fed, and in some embodiments, a separate drain pump (not shown) may be provided for draining the sink basin 102. In order to prevent damage to components of the soaker sink 100 in instances in which fluid is absent from the system, the pump 104 may be powered off Although illustrated as a single drain 110 centrally located in a bottom surface of the sink basin 102, the present disclosure contemplates that the sink basin 102 may employ any number of drains, outlets, exits, openings, etc. at any location.

Fluid Distribution Assembly

Figure 7B:
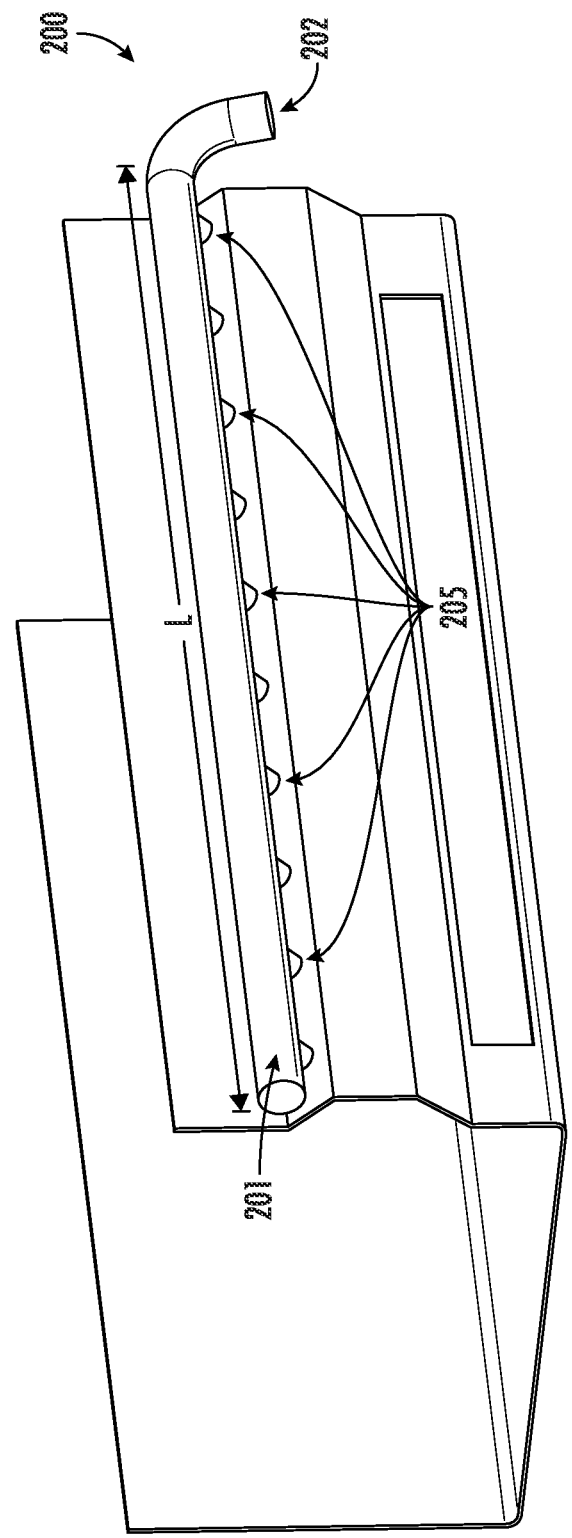
FIG. 7B is a rear view of the portion of the soaker sink of FIG. 7A according to some embodiments.

With reference to FIGS. 7A-7B, a portion of the fluid distribution assembly 200 is illustrated with a portion of the example soaker sink 100, which has been simplified for ease of viewing via, for example, removing the side walls of the sink basin and other components. As shown, the fluid distribution assembly 200 may include a manifold 201 that may define the inlet opening 202, an interior (e.g., interior 203 in FIG. 8) and a plurality of outlets 204 as described above. The fluid distribution assembly 200 may further include one or more flow restrictors (e.g., flow restrictors 300 shown in FIG. 9) configured to modify the flow rate of one or more respective outlets 204. As shown, the manifold 201 may comprise a tubular manifold body 221 such that the inlet opening 202 in the manifold 201 is located on an end of the tubular manifold body. The plurality of outlets 204 may be positioned along a length L of the manifold 201, and the plurality of outlets 204 may thereby be different distances from the inlet opening 202 of the manifold and the pump 104 to each of the respective outlets.

In some embodiments, fluid flow may tend to travel through the outlets 204 farther from the inlet opening 202 and/or the pump 104 at a greater mass flow rate than the outlets closer to the inlet opening 202 and/or the pump 104 when all else is held equal with respect to the outlet dimensions. The fluid velocity in the manifold at each outlet may be related to the percentage of fluid that leaves the outlets, such that, in an instance in which all outlets are the same size and have the same cross-sectional flow area, the outlets farthest from the inlet opening 202 receive the highest flow rate (e.g., mass or volumetric flow rate) and the outlets closest to the inlet opening receive the least mass flow rate of fluid in such situations.

Figure 8:
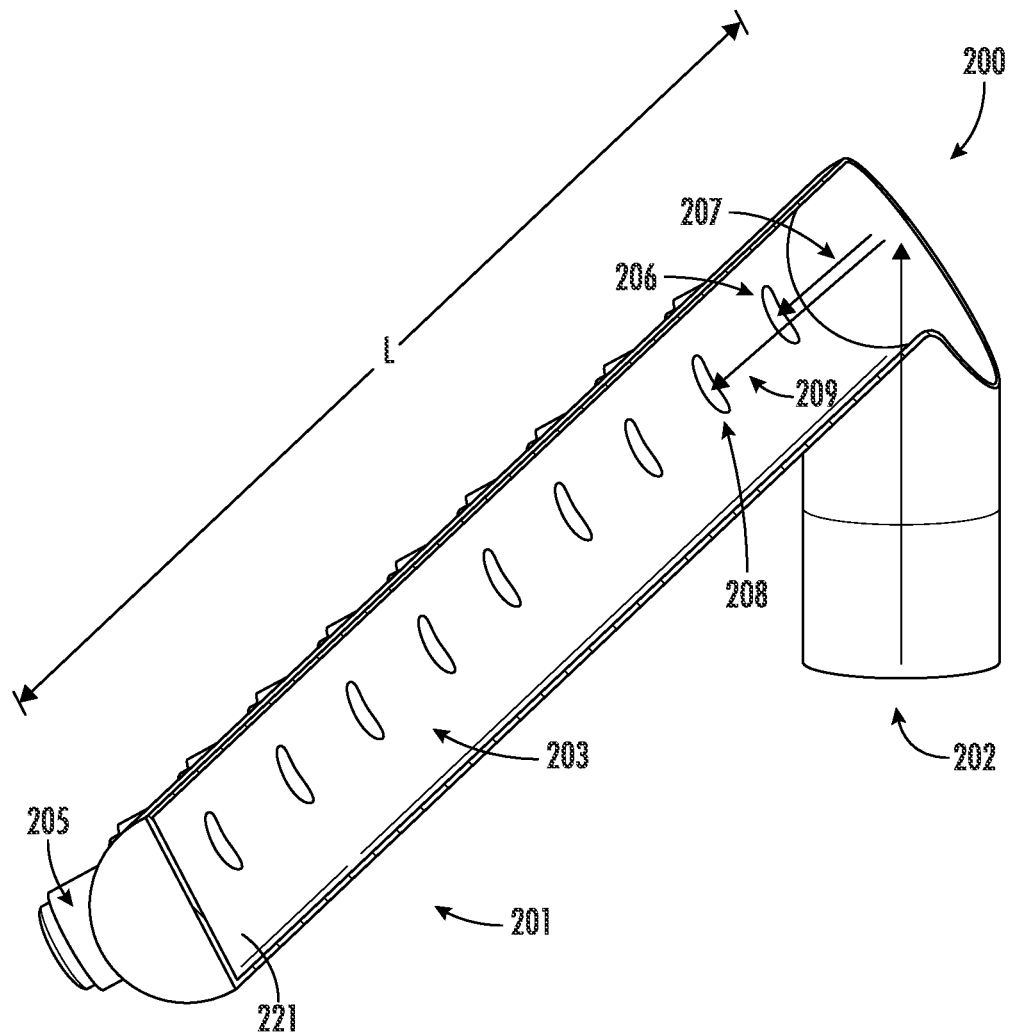
FIG. 8 is a rear interior view of an example manifold of the flow distribution assembly according to some embodiments.
Figure 9:
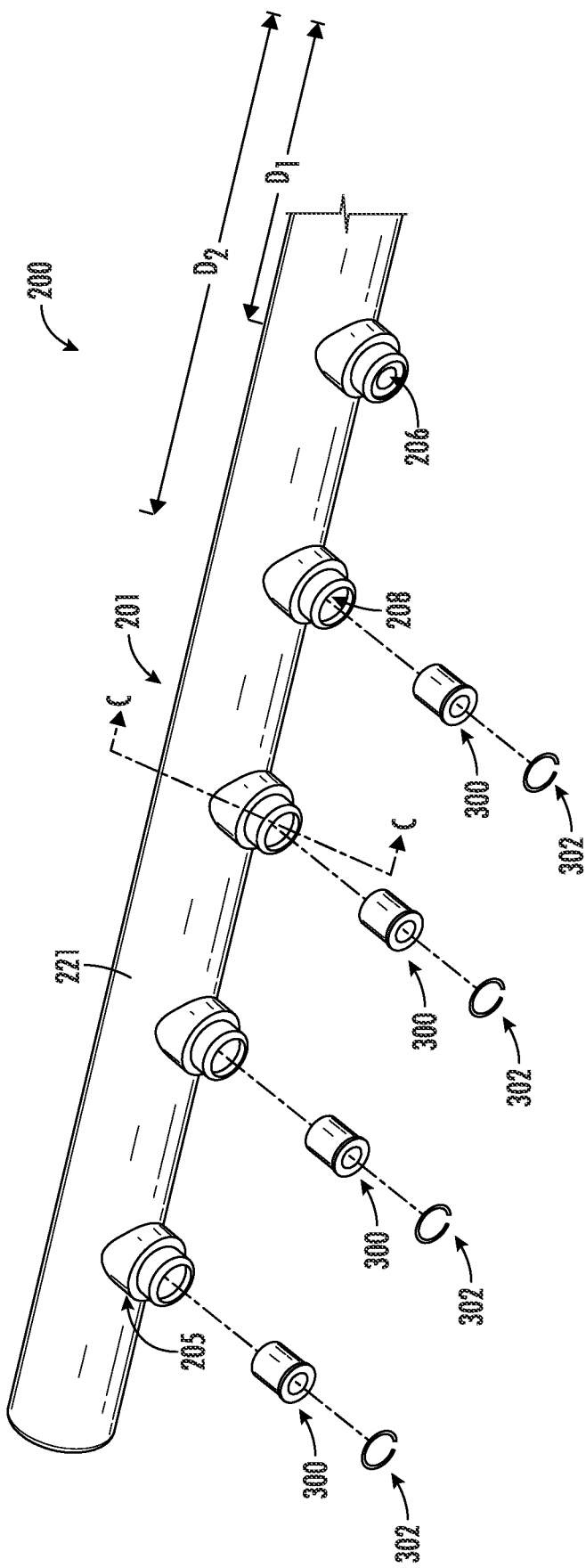
FIG. 9 is a front view of the flow distribution assembly of FIG. 8 illustrating example flow restrictors according to some embodiments.

As described herein, various solutions are provided to control the flow rate through one or more outlets 204 and to provide an improved washing action within the sink basin 102. With reference to FIGS. 8-9, the outlets 204 of the manifold 201 may comprise nozzle bodies 205 extending from the manifold body 221 and into engagement with the wall 101 of the sink basin 102. In some embodiments, the manifold body 221 may be directly coupled to the wall 101 with an opening connecting the manifold body directly with a corresponding opening in the wall, which opening may be the nozzle body. With reference to FIG. 3, a manifold 201 is shown having an inlet opening 202 through which washing fluid is pumped by a pump 104 during recirculation from the sink basin.

Although illustrated herein as a tubular manifold body 221 having a circular cross-sectional shape substantially uniform in cross-sectional area along its length, the present disclosure contemplates that the cross-sectional area, length, shape, or any other parameter of the manifold 201 may be varied based upon the intended application of the soaker sink 100. For example, a rectangular cross-section may be used instead of a circular cross-section. The inlet opening 202 may similarly be dimensioned (e.g., sized and shaped) based upon the intended application of the soaker sink 100. The inlet opening 202 may also be positioned at any location of the manifold 201 and/or may supply fluid to the interior of the manifold 201 from a plurality of locations. For example, in some embodiments, the inlet opening may be positioned on an opposite end of the tubular manifold body, such as in instances in which the pump 104, heater chamber 230, etc. are positioned on an opposing side of the sink basin 102 for ease of use, installation, or otherwise as chosen or required by the particular user or location. The corresponding outlet dimensions may thereby be adjusted depending upon the manifold structure and inlet opening(s) position to achieve the various configurations described herein. Additionally or alternatively, in some embodiments, the inlet opening 202 may be configured to supply fluid to each end of a tubular manifold body (e.g., via a collection of channels, conduits, or the like). In some embodiments, the outlet dimensions of the plurality of outlets 204 and/or the flow restrictor(s) 300 may be configured based, at least in part, on the inlet opening 202 to produce a predetermined flow pattern within the sink basin 102. In some embodiments, the outlets may define different, fixed sizes configured to control the relative properties of the outlets.

The manifold 201 may further define a plurality of outlets 204 including at least a first outlet 206. By way of example, the manifold 201 may define a first outlet 206, a second outlet 208, . . . , a $N^{th}$ outlet. Said differently, the present disclosure contemplates that the number of outlets 204 defined by the manifold 201 may vary based upon the width of the soaker sink 200 and/or the intended application of the soaker sink 200 and may further be varied (e.g., increased or decreased) to adjust the flow rate or position of the fluid discharged by the outlets 204. For example, in some embodiments, each outlet 204 may be spaced a predetermined distance from each other. For example, the soaker sink 200 may use a 6-7 inch (e.g., about 6.8 inches) spacing between adjacent outlets, for example being measured from the center out to the sides of the sink. The number of outlets may be determined by the width of the soaker sink 200, with outlets continuing each predetermined distance until the wall 101 is spanned as shown in, for example, FIG. 7A. In some embodiments, the predetermined spacing may be determined by the type of wash action needed and the type of items being washed in the sink (e.g., heavy grease may require closer nozzles). To provide fluid communication (e.g., fluidically couple) the plurality of outlets 204 and the sink basin 102, each outlet 204 may define a nozzle body 205 that extends from the manifold body 221 to engage a wall 101 of the sink basin 102 to connect the respective outlets 204 with the sink basin 102. As illustrated in FIG. 7B, each nozzle body 205 may be formed, for example, as a cylindrical or tubular conduit through which fluid may flow between corresponding openings in the manifold body 221 and the wall 101 of the sink basin. In some embodiments, the nozzle body may be an opening at the manifold 221 and the wall 101 if the manifold is attached directly to the wall. In some embodiments, each nozzle body 205 may be secured to the wall 101 of the sink basin 102 via welding, via threaded nut, or via other equivalent technique.

For example, in some embodiments, the nozzle body 205 may define a threaded portion at a distal end opposite the manifold 201 and a flange positioned proximally of the threaded portion to engage an outer surface of the wall 101 of the sink basin 102 such that the threaded portion is configured to protrude through an opening in the wall 101 of the sink basin 102 to engage a threaded nut on an inner surface side of the wall 101.

The present disclosure contemplates that the dimensions (e.g., length, cross-sectional size, size, and shape) of the nozzle bodies 205 may be any value for the intended application of the soaker sink 100. In some embodiments, each of the plurality of outlets 204 may be adjustable (e.g., via different flow restrictors) and may define a common outlet dimension (e.g., the same internal diameter and/or cross-sectional area) or a varied outlet dimension depending upon the desired performance and washing action of the outlets. In some embodiments, the fluid flow rate of one or more outlets 204 may be modified by the use of flow restrictors 300 (e.g., inserts mountable within the outlets 204 to control the flow area of the outlet). In some embodiments, the nozzle bodies 205 may define the same dimensions as each other (e.g., the same internal diameter and/or cross-sectional area) and flow restrictors 300 of one or more different dimensions may be inserted into the nozzle bodies to modify the velocity, flow rate, and the like through the nozzle bodies relative to their normal state (e.g., a state without any flow restrictor). The flow restrictors 300 may be configured to vary the outlet dimension for selected outlets 204 such that at least one outlet 204 has a different outlet dimension than one or more other outlets. Choosing flow restrictors of different internal dimensions may be configured, for example, to balance the flow rate and/or velocity between outlets and may be used to adjust each outlet individually relative to the other outlets in concerted or individualized ways. In some embodiments, blanks may be used to completely close one or more outlets 204 (e.g., if higher velocity flow is desired through other outlets).

In some embodiments, the flow restrictors 300 may be collectively used for and configured to modify the flow rate and/or velocity of the plurality of outlets 204. For example, in some embodiments, each of the outlets may include flow restrictors 300 to increase the net velocity of flow through all of the outlets and thus collectively increase the washing action for a given pump rate. In some embodiments, the flow restrictors 300 may all be the same (e.g., having a common dimension and causing the outlets to have a common outlet dimension) and collective set of flow restrictors may be chosen with a certain dimension based on the desired circulation speed, outlet velocity, and agitation in the sink. In some embodiments, the outlet dimension (e.g., the internal diameter or cross-sectional area) for each outlet 204 may be the same following use of a respective flow restrictor 300, such as in embodiments with identical flow restrictors. In some embodiments, both the collective size and the individual size of the flow restrictors may be fine-tuned to produce an optimal wash action. For example, if greater wash agitation is needed in the entire sink, all flow restrictors 300 may be replaced with narrower flow restrictors even in situations where one flow restrictor is already narrower than another. In some embodiments, the outlet dimension may be measured at a narrowest portion of the outlet, including the flow restrictor, along its length between the manifold body 221 and the sink basin 102. In some embodiments, the outlet dimension may refer to multiple parameters of the nozzle. In some embodiments, the outlet dimension may be measured in the same axial location along the outlet's length between the manifold body 221 and the sink basin 102 for each outlet to enable accurate comparison. In some embodiments, the outlet dimension may be empirically determined based on the actual flow rate through each outlet and may be classified accordingly as having a "greater" outlet dimension for all outlet shapes and assemblies having a greater net flow rate and/or a lower net velocity, and likewise as having a "lesser" outlet dimension for all outlet shapes and assemblies having a lower net flow rate and/or a higher net velocity than a given outlet. Furthermore, in some embodiments, multiple outlets 204 may be fluidically coupled with the sink basin 102 at the wall 101 via a common or shared nozzle body 205.

Figure 11:
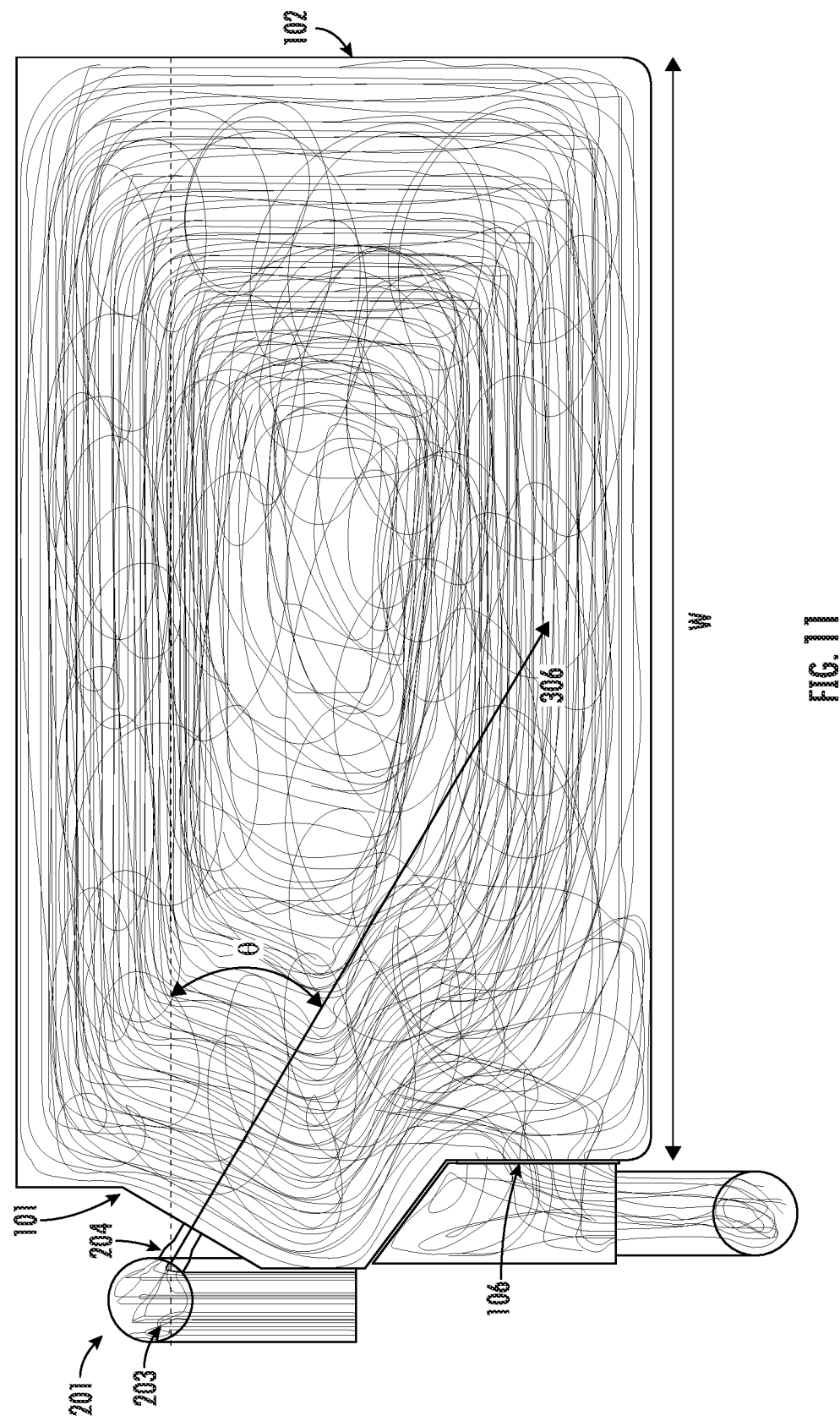
FIG. 11 is a cross-sectional side view of the example soaker sink of FIG. 1-6 including example flow streamlines and an example fluid output angle.

As shown in FIG. 7A and FIG. 11, the wall 101 may also be angled, for example, to adjust the flow direction of the fluid output by the plurality of outlets 204. By way of example, the wall 101 may be form a lip, flange, extension, bend, shelf, dip, recess, etc. at which the nozzle bodies 205 may be attached so as to direct the fluid output by the outlets 204. As illustrated in the example embodiment of FIG. 7A, the wall 101 may be positioned such that the fluid discharged via the outlets 204 is at least partially directed toward a bottom surface of the sink basin 102, with the outlets 204 being engaged with the wall within a horizontal recess formed (e.g., by bending the sheet metal) in the wall, such that fluid from the outlets may, in some embodiments, enter the sink basin within the recess. The recess in the wall 101 may prevent pans from blocking the outlets 204 and/or may facilitate the downward angle of the outlets 204.

With reference to FIG. 11, a side view of the interior of the soaker sink 100 is illustrated during an example washing operation with associated flow streamlines showing the circulation paths of the fluid leaving the outlets. These streamlines illustrate an example outlet flow path 306 of fluid discharged into the sink basin 102 by respective outlets 204. As shown, plurality of outlets 204 may output fluid at an angle θ with respect to the horizontal (e.g., relative to the width-wise dimension (W) of the sink basin, a plane parallel to the bottom of surface of the sink basin 102, or the like). In some embodiments, the angle θ may be varied based upon the dimensions of the sink basin 102 to optimize the circulation flow relative to the shape of the sink basin and the positioning of the outlets. The angle θ may be configured such that the outlet flow path 306 is directed towards the bottom surface of the sink basin 102 so as to cause the fluid discharged by the plurality of outlets 204 to be at least partially redirected by the bottom surface of the sink basin 102 (e.g., redirected in the counter-clockwise direction relative to the orientation of FIG. 11). Said differently, the angle θ may be such that the fluid discharged by the plurality of outlets 204 glances, skips, bounces, ricochets, or otherwise deflects off of the bottom surface of the sink basin 102. Following this redirection, the angle θ and width (W) of the sink basin 102 may be such that, in some embodiments, the flow is further redirected by a front wall (e.g., a surface opposite the manifold 201) of the sink basin 102.

The angle θ may, in some embodiments, be determined based upon the attachment between the manifold 201 and the sink basin 102 as described above. For example, in some embodiments, each nozzle body 205 may be secured to the wall 101 of the sink basin 102 via welding, via threaded nut, or via other equivalent technique such that the orientation of the nozzle body defines the angle θ. For example, in some embodiments, the nozzle body and the outlet flow path 306 may form a 30° angle with respect to the horizontal (e.g., θ is 30°). In some embodiments, the nozzle body 205 may intersect the wall 101 at a perpendicular angle, such that the wall of the recess may be sloped perpendicular to the outlet flow path 306. In some embodiments, one or more of the flow restrictors 300 may be manufactured at an offset angle (e.g., the internal bore defines an axis that is angled relative to the outer surface of the flow restrictor and the nozzle body, such that fluid leaving the flow restrictor is directed at a different angle than the nozzle body). Thus, when the flow restrictor is inserted into the nozzle body, the net angle of the outlet changes from the angle of the nozzle body to the angle of the offset internal bore of the flow restrictor. Each flow restrictor may be offset by a same amount, in an instance in which the outlets are collectively reoriented to improve washing action. In some embodiments, individual outlets may be offset at different angles from one or more other outlets to produce a different washing action between outlets. In some embodiments, the offset may be used to customize or calibrate the performance of the soaker sink for the customer, with the flow restrictors 300 being replaceable parts making the offset angle quickly configurable on site after manufacture of the soaker sink.

Although described and illustrated herein with reference to a plurality of outlets 204 and nozzle bodies 205 configured to provide a common outlet flow path 306 (e.g., discharge fluid from the manifold 201 at substantially the same angle θ), the present disclosure contemplates that the outlet flow path for each outlet 204 may vary based upon the intended application of the soaker sink 100 (e.g., one or more of the outlets may be oriented at a different angle from the others). In some instances, as described hereafter, one or more flow restrictors 300 may be removably coupled with one or more outlets 204 of a plurality of outlets so as to dynamically modify the angle θ at which the fluid discharged from the manifold 201. For example, a flow restrictor 300 may be configured to increase or decrease the angle θ based upon the intended application of the soaker sink 100 (e.g., to modify or adjust the washing action within the sink basin 102). In one example, the angle θ with respect to the horizontal may be between approximately 30° and 33° in order to provide an improved washing action (e.g., improve circulation within the sink basin 102) for a first size sink (e.g., a sink having a first front-to-back width). In an example, the angle θ with respect to the horizontal may be between approximately 27° and 30° for a second size sink smaller than the first size sink (e.g., a sink having a lesser front-to-back width than the first front to back width). In some embodiments, the outlets may be oriented towards a location at or approximately 11 inches from the front wall of the sink basin 102.

In order to modify the mass flow rate and/or velocity of the fluid discharged via the respective outlets 204 of the manifold 201, the distance between each outlet 204 and each other and/or the inlet opening 202 may be modified and/or the cross-sectional area of each outlet 204 may be modified. In some embodiments, only the cross-sectional area may be modified in situ after manufacturing (e.g., via interchangeable flow restrictors 300). In some embodiments, many parameters of the fluid distribution assembly and outlet assemblies may alter the mass flow rate and velocity of the fluid through the outlets. In some embodiments, an outlet dimension (e.g., cross-sectional area, diameter, etc.) may be changeable via inserting different flow restrictors while the remaining parameters of the other flow restrictors and/or fluid distribution assemblies are kept constant. The volumetric flow rate (Q) for each outlet may be determined as a product of the flow velocity (v) and the cross-sectional vector area (A) or $Q=v \cdot A$, and the total volumetric flow rate through the manifold may be determined as the sum of the respective flow rates of each outlet $Q=(v_1 \cdot A_1)+(v_2 \cdot A_2)+(v_3 \cdot A_3)+(v_4 \cdot A_4)+\ldots$, which may also depend upon the flow rate of the pump. As such, the collective fluid flow discharged from the manifold 201 via the outlets 204 (Q), and by association the mass flow rate of the collective fluid flow across all outlets, may equal that of the fluid flow input to the manifold 201 from the pump, and the balance of the fluid flow between the outlets may be determined based upon the cross-sectional (A) of the respective outlets 204 and the respective fluid velocity (v) at each outlet 204. Said differently, in order to modify the velocity (v) of fluid output by a particular outlet 204 to improve the washing action as described above, the cross-sectional area (e.g., an outlet dimension) for the particular outlet 204 may be adjusted, such as by being reduced (e.g., via use of a narrower flow restrictor) resulting in an increased velocity for the particular outlet 204 for a particular volumetric flow rate (Q) and, as between outlets, may also change the flow rate of the outlets. Increasing the velocity and narrowing the cross-sectional area of an outlet may reduce the mass/volumetric flow rate of one nozzle relative to the other nozzles (e.g., by somewhat decreasing the flow rate of the restricted nozzle and proportionately increasing the flow rate of the remaining nozzles). Using flow restrictors in every nozzle or replacing existing flow restrictors with narrower flow restrictors may increase the velocity of the fluid entering the tub and collectively increase agitation of the dishware while retaining the same mass flow rate. In some example embodiments, flow restrictors 300 having equal internal flow areas (A) may be used in each outlet 204 of the soaker sink. In some example embodiments, flow restrictors 300 having internal flow areas (A) of differing sizes may be used. In some example embodiments, the flow restrictors 300 may be configured to equalize the velocity of the fluid leaving each nozzle. In some embodiments, the net mass flow through all nozzles collectively ($Q_{TOT}$) may remain constant or substantially constant and may be determined by the net mass flow rate of the pump.

Figure 12:
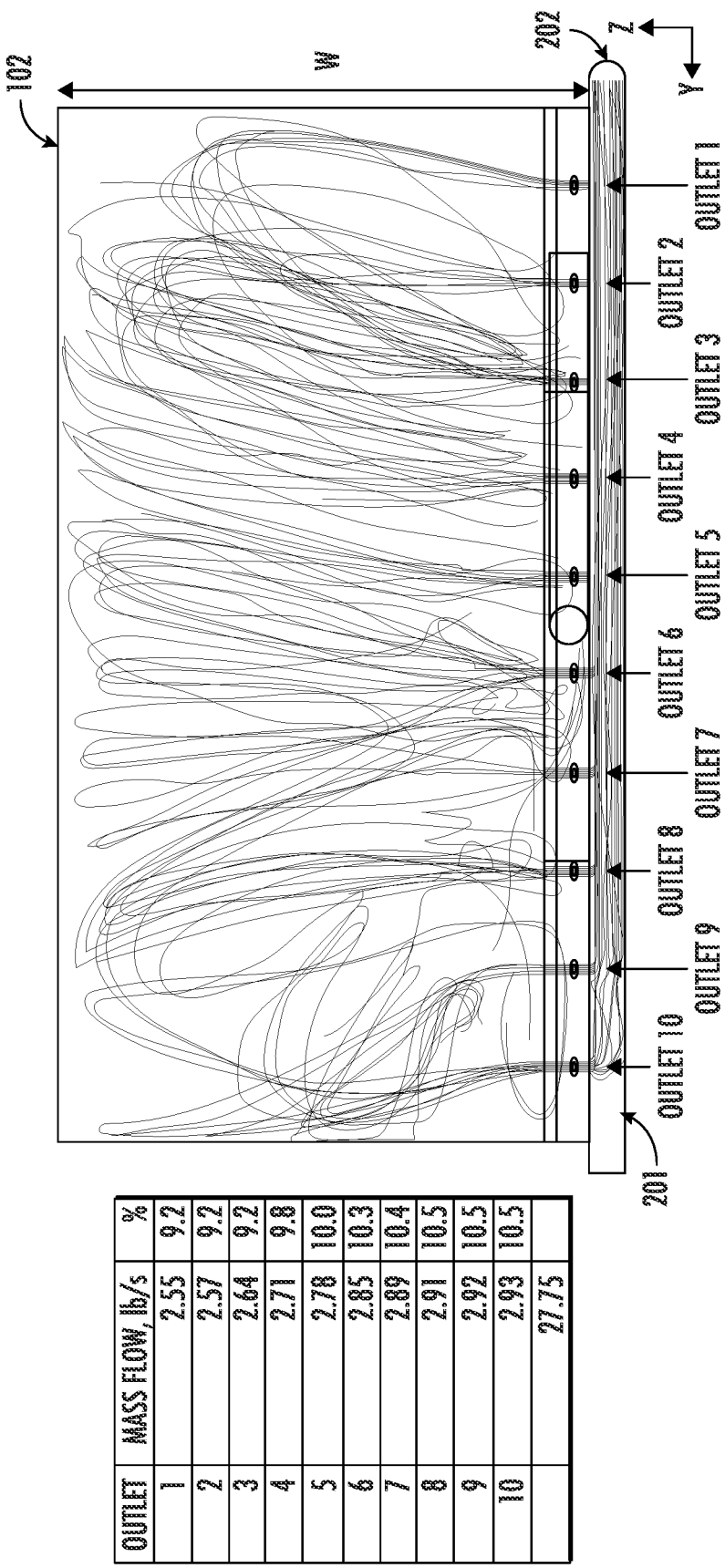
FIG. 12 is a top view of the example soaker sink of FIG. 11 including example flow streamlines and example mass flow rate outputs.

With reference to FIG. 12, a top view of the interior of the soaker sink 100 is illustrated during an example washing operation with associated flow streamlines. These streamlines illustrate an example outlet flow path of fluid discharged into the sink basin 102 by respective outlets 204. As shown in FIG. 12, the manifold 201 may include, in some embodiments, ten (10) outlets 204 that may be evenly spaced along a length of the manifold 201 (e.g., equidistant from each other and/or equally spaced across the width of the sink basin). Although illustrated and described herein with reference to an example embodiment having ten (10) evenly spaced outlets 204, the present disclosure contemplates that the number of outlets and the relative spacing between the outlets 204 and/or the inlet opening 202 may vary based upon the size of the soaker sink and/or the intended application or washing action of the soaker sink 100. In the particular implementation of FIG. 12, the outlets 204 may be configured such that each of the plurality of outlets 204 includes a common outlet dimension (e.g., cross-sectional area, diameter, or the like). For example, the flow depicted in FIG. 12 was generated using identical flow restrictors having round bores. In some embodiments, one or more of the outlets may alternatively have a different outlet dimension (e.g., to balance the velocity of fluid exiting each outlet). In some embodiments, the outlet dimensions may be staggered along the length of the manifold. Such outlet dimensions may, for example, be defined by the dimensions of the flow restrictor 300 coupled thereto as described herein. In the embodiment illustrated in FIG. 12 having the same, common outlet dimensions across all outlets, the flow rate (e.g., mass flow rate and by association volumetric flow rate (Q)) increases for each subsequent outlet 204 along the length of the manifold 201 as shown in the table of FIG. 12. As the fluid flow travels from the inlet opening 202 along the interior of the manifold 201, the fluid flow velocity within the manifold decreases due to frictional forces, shear forces, resistance to flow, etc., and the mass flow rate increases at each subsequent outlet moving away from the inlet in the depicted embodiment. Said differently, the flow velocity within the manifold 201 proximate the inlet opening 202 is greatest such that the mass and volumetric flow rate of the fluid discharged by the outlets 204 closer in distance to the inlet opening 202 is reduced (e.g., the mass flow rate of outlet 10 is greater than the mass flow rate of outlet 1 when the outlet dimensions (inclusive of flow restrictors) are the same). This effect is illustrated in the example mass flow rate value of FIG. 12.

In some embodiments, each of the plurality of outlets 204 may include an inner diameter, inclusive of the effect of any flow restrictors, of between and including approximately 1 inch and approximately 0.25 inches. By way of a particular example, each of the plurality of outlets 204 may define an inner diameter of 0.8 inches, 0.6 inches, or 0.4 inches based upon the size of the sink basin 102, the output of the pump 104, the intended washing action, and/or the like. In some embodiments, each of the plurality of outlets 204 may define the same internal diameter, and in some embodiments, one or more pairs of the plurality of outlets 204 may have different internal diameters (e.g., decreasing diameters between adjacent outlets). The internal diameters may include a narrowest dimension within the outlet between the manifold and the sink basin, inclusive of any flow restrictor (e.g., the inner diameter of the flow restrictor 300 at a narrowest point may be 1 inch to 0.25 inches). In some embodiments, the narrowest dimension of each outlet may be greater than or equal to the size of the openings on the perforated plate covering the inlet opening 106 to prevent clogging.

Figure 10:
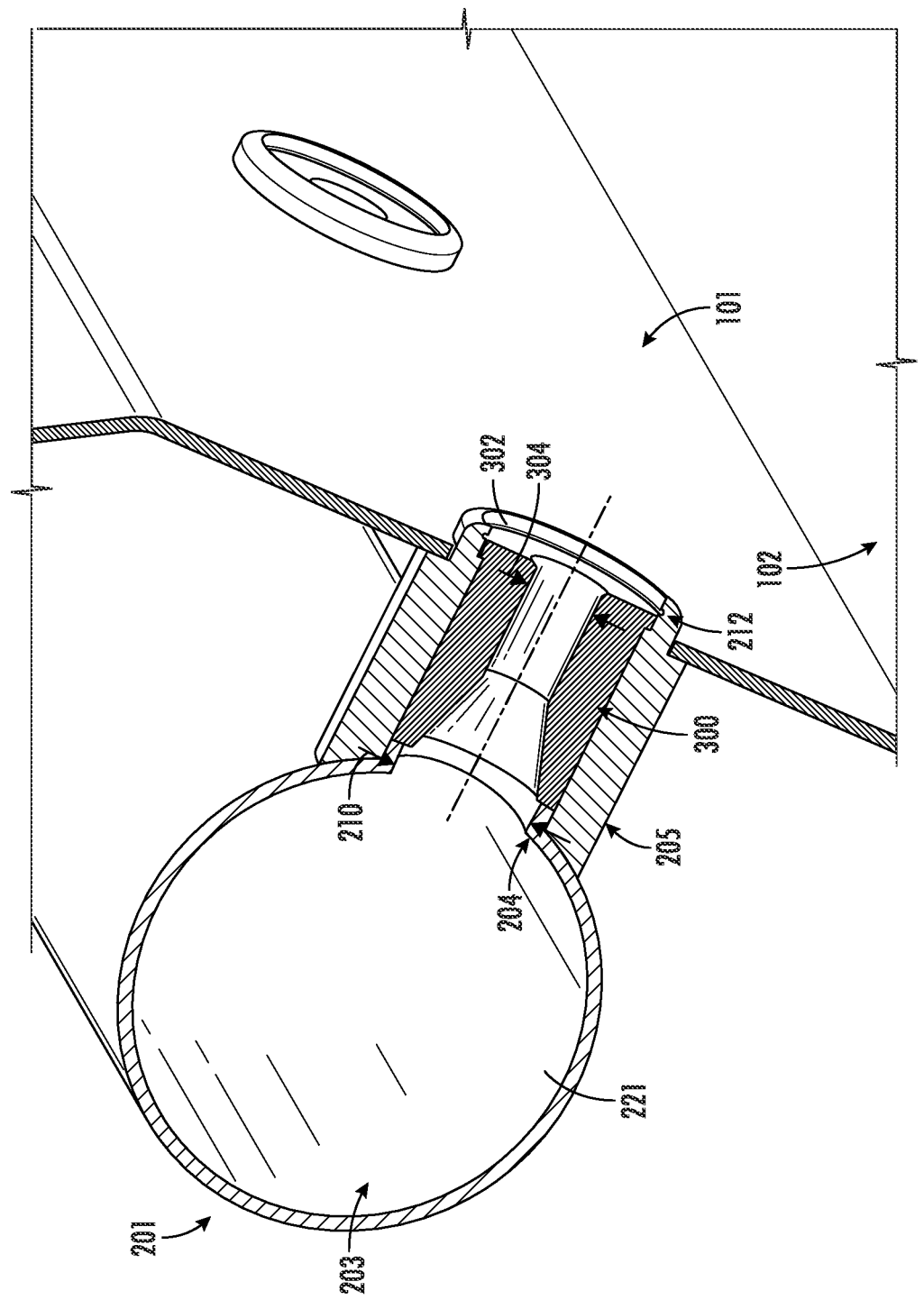
FIG. 10 is a cross-sectional view of the flow distribution assembly of FIG. 9 along C-C according to some embodiments.

As described above and more fully hereafter with reference to FIGS. 9-10, the soaker sink 100 may include a plurality of flow restrictors 300 that are removably coupled with respective outlets 204 in order to modify the volumetric and mass flow rate of the outlet and, by association, control the velocity of the fluid discharged via the respective outlet 204. As such, in some embodiments, the plurality of flow restrictors 300 may be configured to modify (e.g., reduce) the outlet dimension (e.g., inner diameter, cross-sectional area, etc.) of the outlets 204 relative to an open bore of the nozzle body 205. In some embodiments, the present disclosure contemplates that the common outlet dimension of the plurality of outlets 204 may refer to an instance in which each of the outlets 204 receive a respective flow restrictor 300 configured such that each of the plurality of outlets 204 have the same net outlet dimension, inclusive of the effect of each flow restrictor. In instances in which the nozzle bodies 205 define the same dimensions (e.g., diameter, length, etc.) and are identical but for their relative location on the manifold, the plurality of associated flow restrictors 300 may similarly comprise the same shape or configuration (e.g., each of the flow restrictors 300 may be substantially the same in size, shape, orientation, etc.) to cause all of the outlets to have the same common outlet dimension, or the flow restrictors 300 may vary between outlets to cause the outlets to have differing outlet dimensions without altering the nozzle bodies as described herein. In embodiments in which at least one outlet 204 includes a different outlet dimension than another outlet (e.g., at least one outlet has a larger or smaller inner diameter, cross-sectional area, etc.), the corresponding flow restrictors may be dimensioned (e.g., sized and shaped) differently to alter the outlet dimension between outlets, while the nozzle body 205 remains a common internal diameter between outlets (e.g., the flow restrictors may change the sizes of the outlets).

In some instances, the embodiments of the present disclosure may be configured to collectively balance the fluid flow discharged by the plurality of outlets 204. For example, a first flow path 207 may be defined from the inlet opening 202 to the sink basin 102 via the first outlet 206 as shown in FIG. 8. A second flow path 209 may be defined from the inlet opening 202 to the sink basin 102 via the second outlet 208. As the fluid flow travels from the inlet opening 202 along the interior 203 of the manifold 201, the fluid flow velocity decreases due to frictional forces, shear forces, resistance to flow, etc. The fluidic distance $D_2$ between the second outlet 208 and the inlet opening 202 is greater than the fluidic distance $D_1$ between the first outlet 206 and the inlet opening 202. The structure shown and described with respect to FIG. 12 resulted in a greater volumetric and mass flow rate of the fluid discharged via the second outlet 208 (e.g., the larger fluidic distance $D_2$) than the first outlet 206 (e.g., the smaller fluidic distance $D_1$). In some embodiments, the outlet dimension (e.g., area) of each outlet may be different. In particular, the one flow path may define a narrowest cross-sectional area that is smaller than a narrowest cross-sectional area of another outlet. As used herein, the term, "narrowest cross-sectional area", may refer to the cross-sectional area at a narrowest point along the flow path, which in some embodiments may be defined at the outlets (e.g., via flow restrictors 300). In some embodiments, one or more outlets within an otherwise balanced assembly may have a different velocity for one or more specialized purposes as discussed herein (e.g., eight of ten nozzles may be configured via flow restrictor to have the same outlet velocity, while two of the ten have increased velocity via flow restrictor to generate a focused wash area).

In other embodiments, the narrowest cross-sectional area of the outlets 204, the relative positioning between outlets 204, and the respective distance between each outlet 204 and the inlet opening 202 may be varied to modify the flow recirculated to particular locations within the sink basin 102. By way of a non-limiting example, a stand, support, rack, etc. (not shown) may be positioned within the sink basin 102 proximate the $N^{th}$ outlet. As such, the velocity of the fluid discharged by the $N^{th}$ outlet may be increased (e.g. a decrease in the narrowest cross-sectional area) so as to encourage or otherwise facilitate cleaning of the dishware positioned by the example stand, support, rack, or the like (not shown) proximate the $N^{th}$ outlet. In this way, the embodiments of the present disclosure may operate to modify the flow rate of fluid outlet 204 by the manifold 201 at any location or position within the sink basin 102. In some embodiments, one or more outlets 204 may have their outlet dimension adjusted for such a particular purpose while leaving the remaining outlets configured with the same outlet dimension or another predetermined outlet relationship. In some embodiments, the user may replace one or more inserts between cycles based on the particular load being washed or upon choosing a particular purpose of the washer or sub-portion of the washer (e.g., washing a certain category of item requiring a particular wash action).

In some embodiments, the flow rate through the outlets 204 may be controlled in a variety of additional configurations depending upon the predetermined flow pattern desired within the soaker sink. For example, in some embodiments as described above, a uniform mass flow pattern may be desired, such that each outlet may be configured (e.g., via flow restrictors) to output the same or substantially the same flow rate (e.g., volumetric/mass flow rate) by offsetting the differences in flow caused by the relative positioning of the inlet opening 202 and the outlets 204. In some embodiments, areas of higher or lower recirculation intensity may be desired within the wash basin 102, such that a greater flow rate may be directed to one or more sub-portions of the wash basin than to another portion or portions. In some embodiments, a uniform flow velocity may be desired, such that each outlet may be configured (e.g., via flow restrictors) to output the same or substantially the same velocity by offsetting the differences in flow caused by the relative positioning of the inlet opening 202 and the outlets 204.

With reference to FIGS. 9-10, a more detailed view of the flow restrictors 300 is shown. As described herein, in order to adjustably modify the flow rate and velocity of at least one outlet 204, the fluid distribution assembly 200 may include one or more flow restrictors 300 that are removably coupled with one or more outlets 204 of a plurality of outlets. In some embodiments, the flow restrictor 300 may define a body having a shape that is complementary to the shape (e.g., at least the cross-sectional shape) of the nozzle body 205 of the associated outlet 204 such that the flow restrictor 300 may be removable secured within the nozzle body 205. By way of a particular example, the flow restrictor 300 may be formed as a cylindrical sleeve configured to be inserted within the nozzle body 205, wherein the outer shape of the flow restrictor is complementary to the inner shape of the nozzle body 205. In some embodiments, a plurality of flow restrictors 300 may be used. The plurality of flow restrictors 300 may be universally fit to a common outlet 204 shape (e.g., a common inner surface shape of the nozzle body 205 in embodiments with a nozzle body), such that the flow restrictors may be configured to be interchangeably inserted into multiple outlets depending upon the desired configuration.

As described hereafter with reference to FIG. 10, the flow restrictor(s) 300 may operate to reduce the cross-sectional area of one or more outlets 204 removably coupled with the respective flow restrictor(s) 300 in order to modify a flow rate and associated velocity of the fluid discharged via the respective outlet 204, with a narrower outlet generally having less mass flow and a higher velocity than a wider outlet with all else being held equal. As an example, the first outlet 206 is illustrated in FIG. 9 engaged with an associated flow restrictor 300, and the second outlet 208 is illustrated prior to receipt of an associated flow restrictor 300. Although illustrated and described herein with reference to a flow restrictor 300 having a cylindrical shape that complements the cylindrical shape of a corresponding nozzle body 205, the present disclosure contemplates that the flow restrictor 300 may have any size, shape, cross-sectional area, etc. so as to reduce the cross-sectional area of an associated outlet 204. For example, FIG. 10 shows a flow restrictor 300 in cross-sectional view having a tapered upstream section and a generally cylindrical downstream section to smoothly restrict the flow from the wider nozzle body 205 cross-sectional area to the narrower flow restrictor cross-sectional area. As another example, FIG. 13, described below, shows a V-shaped nozzle configured to create a horizontal fan-shaped spray pattern. In some embodiments, flow restrictors may have different narrowest internal diameters and may otherwise be identical to each other.

In order to removably secure the flow restrictor 300 within the respective nozzle body 205, the flow distribution assembly 200 may include one or more fasteners. By way of example, the fluid distribution assembly 200 may include a leaf spring 302 or equivalent mechanism that is, once the flow restrictor 300 is positioned sufficient within the nozzle body 205, configured to be inserted into the nozzle body 205 and located within a groove (e.g., groove 212 in FIG. 10) of the nozzle body 205. In this way, the leaf spring 302 may operate to removably secure the flow restrictor 300 within the nozzle body 205 such that the flow restrictor 300 may be removed and/or replaced to modify the flow rate and associated velocity of the fluid discharged via the outlet 204 while also preventing the flow restrictor from inadvertently being expelled from the nozzle. The present disclosure contemplates that any mechanism for removably coupling the flow restrictor 300 with the outlet 204 may be used.

With reference to the cross-sectional view of FIG. 10, the flow restrictor 300 may operate to reduce the cross-sectional area of the associated outlet 204. By way of example, an internal bore of the nozzle body 205 may define a first cross-sectional area 210 at its narrowest longitudinal point, and an internal bore of the flow restrictor 300 may define a second cross-sectional area 304 at its narrowest longitudinal point. The second cross-sectional area may be smaller than the first cross-sectional area 210 such that securing the flow restrictor 300 within the nozzle body 205 reduces the flow rate and increases the velocity of the outlet 204 with all else being held equal. In some embodiments, the inner cross-sectional area of the nozzle body 205 may be constant. As described above, the collective fluid flow discharged from the manifold 201 via the outlets 204 (Q) may be determined based upon the net cross-sectional (A) of the respective outlets 204 and the respective fluid velocity (v) at the outlet 204. This net fluid flow may be determined also by the flow rate of the pump, such that the cross-sectional area of each outlet 204 may be determined to affect the incremental flow rate of each outlet (e.g., for N outlets and a pump flow rate of Q', an evenly balanced set of outlets would produce a flow rate of Q'/N for each nozzle).

As the fluid flow travels from the inlet opening 202 along the interior 203 of the manifold 201, the fluid flow velocity decreases due to frictional forces, shear forces, resistance to flow, etc. As such, the volumetric and mass flow rate and the velocity at each subsequent outlet 204 is increased as shown in FIG. 12. In some embodiments, the discharge of fluid from the interior of the manifold 201 may be balanced such that, for example, the velocity or flow rate (e.g., measured as mass or volumetric flow rate) associated with each outlet 204 is substantially uniform.

In other embodiments, however, the flow restrictors 300 may be used to dynamically modify the narrowest cross-sectional area of the outlets 204 so as to modify the flow recirculated to particular locations within the sink basin 102. Similar to the embodiments described with reference to FIGS. 7A-7B, a stand, support, rack, etc. (not shown) may be positioned within the sink basin 102 proximate the $N^{th}$ outlet 204. As such, the velocity of the fluid discharged by the $N^{th}$ outlet 204 may be increased by decreasing the size of the cross-sectional area or inner diameter of the outlet 204, such as by replacing the flow restrictor 300 with another flow restrictor 300 having a smaller cross-sectional area at its narrowest longitudinal point so as to encourage or otherwise facilitate cleaning of the dishware positioned by the example stand, support, rack, or the like (not shown) proximate the $N^{th}$ outlet 204. In this way, the embodiments of the present disclosure may operate to allow for dynamic modification of the flow rate of any outlet 204 of the manifold 201 so as to modify the recirculation of fluid within the sink basin 102. As such, the use of flow restrictors 300 may operate to modify, adjust, or fine tune the total washing action (e.g., vary the fluid output velocity, volumetric flow rate, mass flow rate, etc.) depending on the size of the sink basin 102, the pressure or output flow rate from the pump 104, the number of nozzles 204, the type of dishes being washed, customer preference, wash time required, and/or the like.

In some embodiments, a separate fluid distribution assembly, or portion thereof, may be sold to replace an existing fluid distribution assembly (e.g., to add the flow restriction capabilities via retrofit to an existing soaker sink). In some embodiments, one or more (e.g., a set) flow restrictors 300 may be sold separately to modify the flow within a soaker sink basin to allow the user to fine tune the wash performance. For example, two or more predetermined recirculation flow patterns may be enabled by swapping sets of flow restrictors or otherwise replacing the flow restrictors at each nozzle. In some embodiments, an intensified wash zone may be created by inserting narrower flow restrictors in a subset of the nozzles, thus increasing the velocity at those nozzles.

Figure 13:
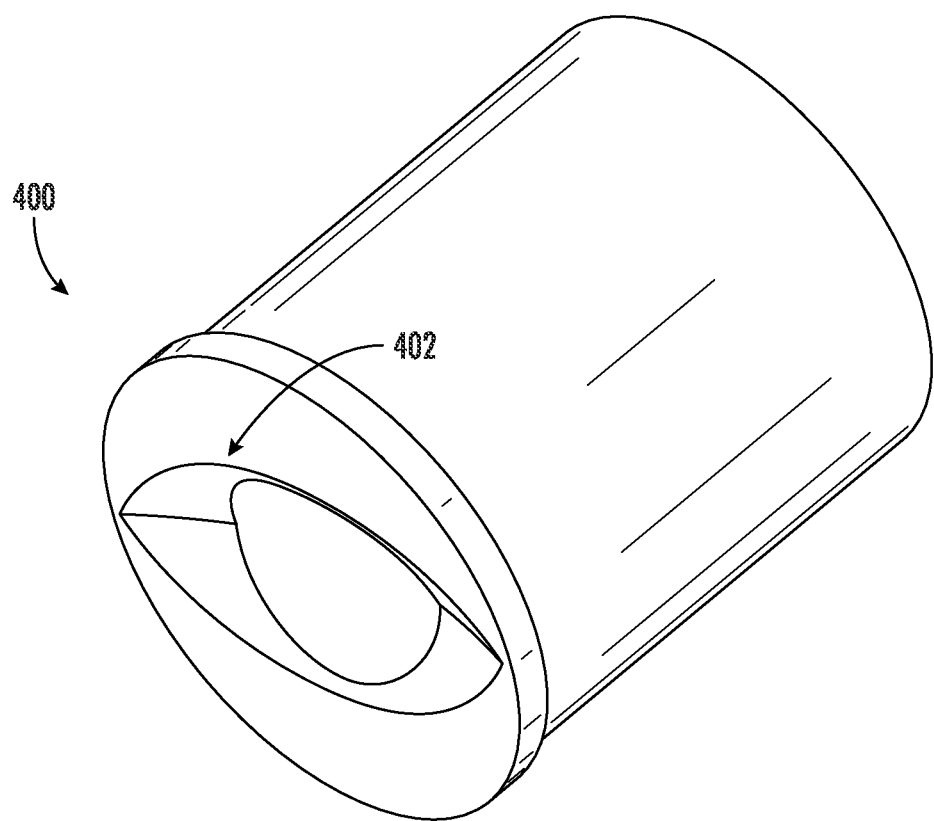
FIG. 13 is an example nozzle configuration for use with some example embodiments of the present disclosure.

In some embodiments, as shown in FIG. 13, the outlets 204 and/or the flow restrictors 300 may define a V-shaped flow restrictor 400 configured to facilitate or otherwise direct the discharge of fluid from the manifold 201. The V-shaped flow restrictor 400 may, as shown, define a notch, indentation, depression, cavity, channel, trough, or other such flow feature 402 configured to modify the output flow of an outlet 204 coupled with the V-shaped flow restrictor 400. In some embodiments, as shown in FIG. 13, the flow feature 402 may define a V-shaped notch configured to increase the spread of the fluid discharged by the outlet 204 (e.g., a V-shaped nozzle configuration). In particular, the V-shaped flow restrictor 400 may define a notch 402 (e.g. a flow feature) that is oriented horizontally (e.g., parallel with respect to the bottom surface of the sink basin 102) so as to increase the horizontal spread of the fluid discharged by the outlet 204. Said differently, the notch 402 of the V-shaped flow restrictor 400 may cause the fluid discharged by the outlet 204 associated with the V-shaped flow restrictor 400 to fan outwardly in a horizontal direction (e.g., parallel with respect to the bottom surface of the sink basin 102) so as to provide a wider flow path and increase and improve circulation of the washing action within the sink basin 102 across the full width of the basin. The present disclosure contemplates that, in some embodiments, the outlets 204 may comprise the V-shaped flow restrictor 400 while, in other embodiments, other versions of the flow restrictor 300 may be used. In some embodiments, fewer outlets may be needed with V-shaped flow restrictors 400 than with cylindrical/circular bored flow restrictors because of the wider flow of the V-shaped outlets. Although illustrated with a V-shaped flow feature 402, the present disclosure contemplates that the flow restrictors may include a feature of any type, dimension, orientation, etc. based upon the intended washing action of the soaker sink 100.

Methods associated with the soaker sinks, flow distribution assemblies, and various components, assemblies, and devices disclosed herein may also be provided. A method of adjusting the flow rate through one or more nozzles of the flow distribution assembly may include inserting a flow restrictor into a nozzle body from within the soaker sink and securing the flow restrictor in place (e.g., via engaging a leaf spring 302 with a groove 212 in the nozzle body 205 as shown in FIG. 10). In some embodiments, the method may first include removing an existing flow restrictor by disconnecting the fastener and removing the flow restrictor (e.g., via the sink basin) in a reverse operation of the insertion process.

In some embodiments, a method of using various embodiments of the soaker sink described herein may be provided. The method may include filling the sink basin with fluid (e.g., fresh water with or without detergent additives), adding wash items to be washed, and initiating operation of the pump to recirculate the fluid from the inlet opening 106 to the fluid distribution assembly 200 and back into the sink basin. In various embodiments discussed herein, the sink basin 102 may be filled sufficiently high with fluid to submerge the nozzles 204 during recirculation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fluid distribution assembly for a soaker sink, the assembly comprising:
  a manifold defining:
    an inlet opening;
    an interior configured to receive a fluid flow input via the inlet opening; and
    a plurality of outlets configured to permit discharge of fluid from the interior of the manifold to a sink basin of the soaker sink, the plurality of outlets comprising a first outlet; and
  a flow restrictor removably coupled with the first outlet, wherein the plurality of outlets comprise a plurality of rigid nozzle bodies extending from a manifold body of the manifold and configured to engage a wall of the sink basin to connect the plurality of outlets with the sink basin, the flow restrictor being removably coupled with a first rigid nozzle body of the priority plurality of rigid nozzle bodies, and
  wherein the manifold body is spaced apart from the wall of the sink basin by the plurality of rigid nozzle bodies, the plurality of rigid nozzle bodies extending at least between the wall and the manifold body external to the sink basin and at least partly supporting the manifold body.

2. The fluid distribution assembly according to claim 1, wherein the flow restrictor is configured to be removably secured entirely within the first rigid nozzle body of the plurality of rigid nozzle bodies.

3. The fluid distribution assembly according to claim 2, wherein an internal bore of the first rigid nozzle body defines a first cross-sectional area at its narrowest longitudinal point, and an internal bore of the flow restrictor defines a second cross-sectional area at a narrowest longitudinal point smaller than the first cross-sectional area such that securing the flow restrictor within the first rigid nozzle body reduces a flow rate of the first outlet and increases a flow velocity of the first outlet.

4. The fluid distribution assembly according to claim 2, further comprising a fastener configured to removably secure the flow restrictor to the first rigid nozzle body.

5. The fluid distribution assembly according to claim 4, wherein the fastener comprises a leaf spring, wherein the first rigid nozzle body defines a groove configured to receive the leaf spring therein to removably secure the flow restrictor within the first rigid nozzle body.

6. The fluid distribution assembly according to claim 1, wherein the manifold body comprises a cylindrical manifold body, and wherein the plurality of rigid nozzle bodies and the flow restrictor are disposed entirely outside the cylindrical manifold body.

7. The fluid distribution assembly according to claim 1, comprising a plurality of flow restrictors, including the flow restrictor, wherein each of the plurality of flow restrictors is removably coupled with a respective one of the plurality of outlets, including the flow restrictor removably coupled with the first outlet, wherein the each of the plurality of flow restrictors is positioned entirely within a respective one of the plurality of rigid nozzle bodies.

8. The fluid distribution assembly according to claim 7, wherein each of the plurality of flow restrictors has a different internal diameter and the plurality of flow restrictors are positioned along a length of the manifold body in order of increasing internal diameter to balance a flow rate of the fluid between the plurality of outlets.

9. The fluid distribution assembly according to claim 8, wherein a relative positioning between each of the plurality of outlets and respective dimensions defined by each flow restrictor to control a respective flow rate of each outlet are configured to collectively balance the discharge of fluid from the interior of the manifold body such that a flow rate associated with each outlet is substantially uniform.

10. A soaker sink comprising:
  a sink basin configured to receive one or more wash items therein, the sink basin defining an inlet opening;
  a manifold defining:
    an inlet opening;
    an interior configured to receive a fluid flow input via the inlet opening of the manifold; and
    a plurality of outlets configured to permit discharge of fluid from the interior of the manifold to the sink basin, the plurality of outlets comprising a first outlet; and
  a pump fluidically coupled with the inlet opening of the sink basin and the inlet opening of the manifold to recirculate fluid from the sink basin to the manifold for delivery of the fluid into the sink basin; and
  a flow restrictor removably coupled with the first outlet, wherein the plurality of outlets comprise a plurality of rigid nozzle bodies extending from a manifold body of the manifold and configured to engage a wall of the sink basin to connect the plurality of outlets with the sink basin, the flow restrictor being removably coupled with a first rigid nozzle body of the plurality of rigid nozzle bodies, and wherein the manifold body is spaced apart from the wall of the sink basin by the plurality of rigid nozzle bodies, the plurality of rigid nozzle bodies extending at least between the wall and the manifold body external to the sink basin and at least partly supporting the manifold body.

11. The soaker sink according to claim 10, wherein the flow restrictor is configured to be removably secured entirely within the first rigid nozzle body of the plurality of rigid nozzle bodies.

12. The soaker sink according to claim 11, wherein an internal bore of the first rigid nozzle body defines a first cross-sectional area at its narrowest longitudinal point, and an internal bore of the flow restrictor defines a second cross-sectional area at a narrowest longitudinal point smaller than the first cross-sectional area such that securing the flow restrictor within the first rigid nozzle body reduces a flow rate of the first outlet.

13. The soaker sink according to claim 10, comprising a plurality of flow restrictors, including the flow restrictor, wherein each of the plurality of flow restrictors is removably coupled with a respective one of the plurality of outlets, including the flow restrictor removably coupled with the first outlet, wherein the each of the plurality of flow restrictors is positioned entirely within a respective one of the plurality of rigid nozzle bodies.

14. The soaker sink according to claim 13, wherein a relative positioning between each of the plurality of outlets and respective dimensions defined by each flow restrictor to control a respective flow rate of each outlet are configured to collectively balance the discharge of fluid from the interior of the manifold body such that a flow rate associated with each outlet is substantially uniform.

15. The soaker sink according to claim 14, wherein each of the plurality of flow restrictors defines a same cross-sectional area at a narrowest longitudinal point.

16. The soaker sink according to claim 15, wherein each of the plurality of flow restrictors is identical.

17. The soaker sink according to claim 11, wherein an end of the first rigid nozzle body is configured to engage the wall of a sink basin by insertion from outside the sink basin through corresponding openings in the wall, and wherein the flow restrictor is configured to be inserted into the first rigid nozzle body from an interior of the sink basin.

18. The fluid distribution assembly according to claim 6, wherein the rigid nozzle body and flow restrictor are disposed entirely downstream of and external to an interior of the manifold body such that the interior of the manifold comprises a smooth interior without protrusions.

19. The fluid distribution assembly according to claim 1, wherein two or more outlets of the plurality of outlets are fluidically connected with the sink basin via a shared rigid nozzle body of the plurality of rigid nozzle bodies.

20. The fluid distribution assembly according to claim 1, wherein each rigid nozzle body of the plurality of rigid nozzle bodies is a single piece of material extending between the manifold body and the wall of the sink basin, and wherein the manifold body is configured to receive all fluid flow from a pump of the soaker sink.

21. The soaker sink according to claim 10, wherein the plurality of rigid nozzle bodies are configured to be angled downwardly from the manifold to the wall of the soaker sink.

22. The soaker sink according to claim 10, wherein the flow restrictor is configured to be inserted into and removable from a distal end of the first rigid nozzle body within the sink basin, the distal end being opposite the manifold body.

* * * * *